United States Patent
Khoo et al.

(10) Patent No.: US 8,820,109 B2
(45) Date of Patent: Sep. 2, 2014

(54) POINT OF SALE METHOD AND APPARATUS FOR MAKING AND DISPENSING AERATED FROZEN FOOD PRODUCTS

(75) Inventors: Christopher K. Khoo, Lake in the Hills, IL (US); William A. Miller, Buffalo Grove, IL (US)

(73) Assignee: Fluid Management Operations LLC, Wheeling, IL (US)

( * ) Notice: Subject to any disclaimer, the term of this patent is extended or adjusted under 35 U.S.C. 154(b) by 1363 days.

(21) Appl. No.: 12/553,705

(22) Filed: Sep. 3, 2009

(65) Prior Publication Data

US 2010/0062128 A1    Mar. 11, 2010

Related U.S. Application Data

(63) Continuation-in-part of application No. 12/408,380, filed on Mar. 20, 2009, now Pat. No. 8,109,113.

(60) Provisional application No. 61/095,051, filed on Sep. 8, 2008.

(51) Int. Cl.

| | |
|---|---|
| *A23G 9/00* | (2006.01) |
| *A23F 5/46* | (2006.01) |
| *A23G 9/28* | (2006.01) |
| *A23G 9/22* | (2006.01) |
| *A47J 31/40* | (2006.01) |
| *G07F 17/00* | (2006.01) |
| *G07F 13/06* | (2006.01) |

(52) U.S. Cl.
CPC ............... *G07F 13/06* (2013.01); *A23F 5/465* (2013.01); *A23G 9/281* (2013.01); *A23G 9/28* (2013.01); *A23G 9/22* (2013.01); *A47J 31/402* (2013.01); *G07F 17/0071* (2013.01)
USPC .................... 62/345; 62/392; 62/342; 62/347

(58) Field of Classification Search
USPC ............. 62/345–34, 382, 345–347, 389, 392; 99/450.1, 450.7
See application file for complete search history.

(56) References Cited

U.S. PATENT DOCUMENTS

| 5,271,572 A | 12/1993 | Grandi |
| 5,292,030 A | 3/1994 | Kateman et al. |
| 2003/0085237 A1 | 5/2003 | Kateman et al. |

FOREIGN PATENT DOCUMENTS

JP    10-295266 A    11/1998

OTHER PUBLICATIONS

International Search Report for related International application No. PCT/US2009/056159; ISR dated Apr. 19, 2010.

*Primary Examiner* — Cassey D Bauer
(74) *Attorney, Agent, or Firm* — Miller, Matthias & Hull LLP

(57) ABSTRACT

An apparatus for making and dispensing frozen aerated products includes a rotating horizontal freeze plate with an upper surface for receiving a chilled aerated mix. The chilled aerated mix includes, in one embodiment, a base that has been sufficiently aerated, and at least one flavor. The horizontal freeze plate rotates about its central axis. The apparatus also includes a spreader body for distributing the chilled aerated mix on the rotating freeze plate. The spreader body extends radially across at least a portion of the upper surface of the freeze plate. The apparatus further includes a scraper for scraping frozen aerated mix off of the rotating freeze plate. The scraper includes a scraper blade with a leading edge that extends radially across the portion of the freeze plate and that engages the upper surface of the freeze plate. The scraper blade is directed opposite the direction of rotation of the freeze plate. The scraper further includes a body that forms an elongated semi-cylindrical channel above the scraper blade that extends radially above the freeze plate for the collection of scraped, frozen and aerated mix. The apparatus also includes a plow for pushing the scraped, frozen and aerated mix through the channel towards a cup held by a cup-lifter mechanism disposed at an end of the channel. The action of the plow pushes the scraped frozen aerated mix through the channel and into the cup resulting in a generally round scoop of scraped frozen aerated mix in the cup that resembles a serving scoop experienced at a traditional ice cream shop.

17 Claims, 34 Drawing Sheets

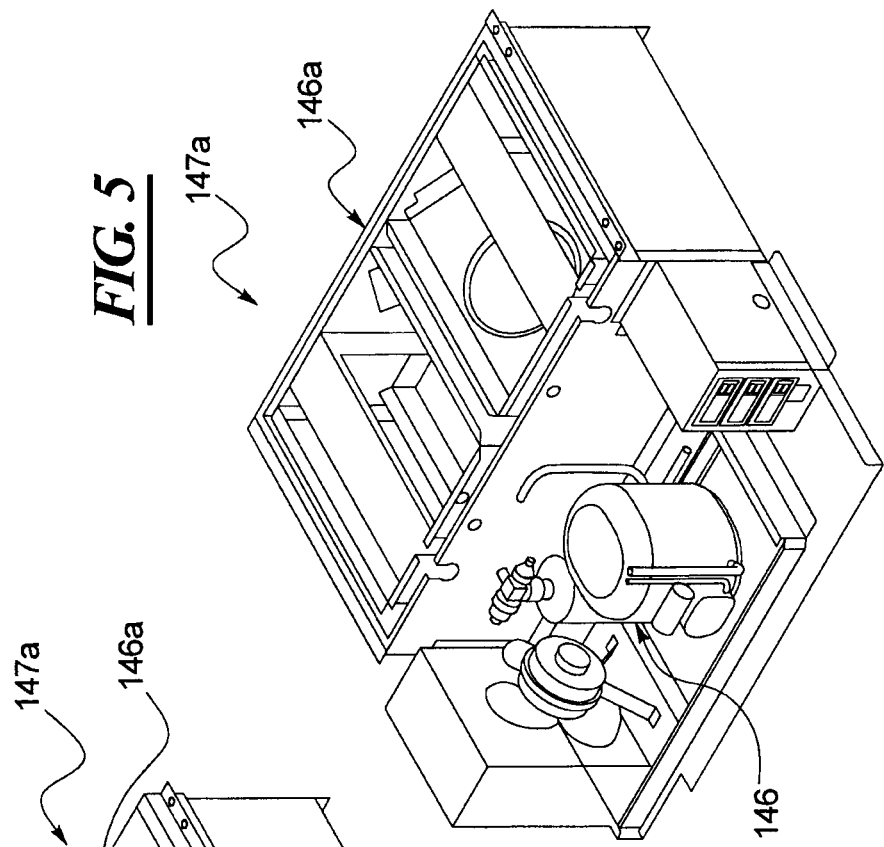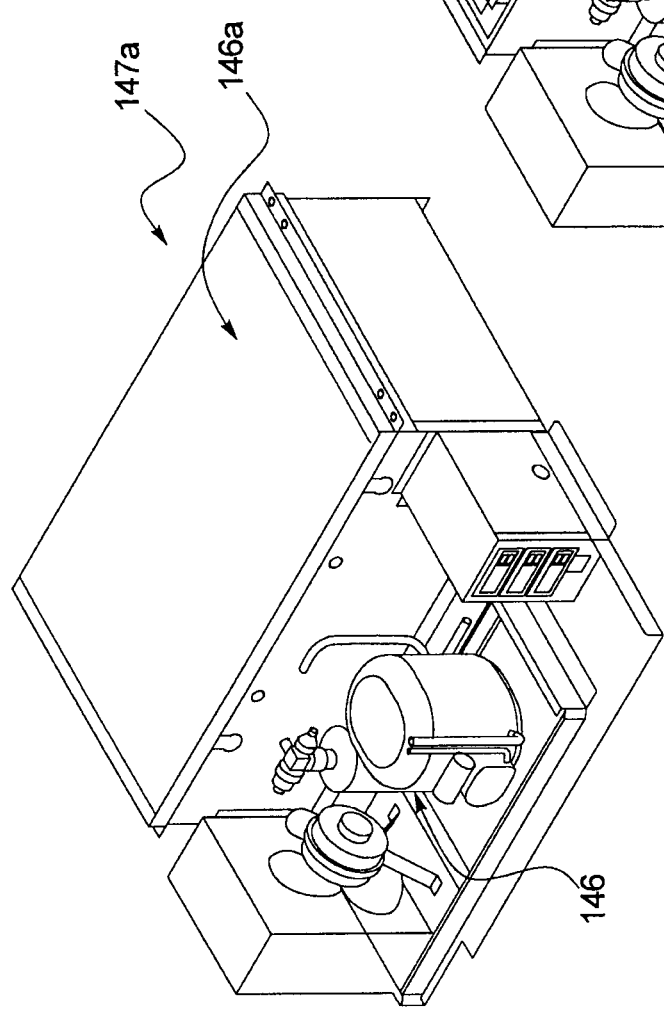

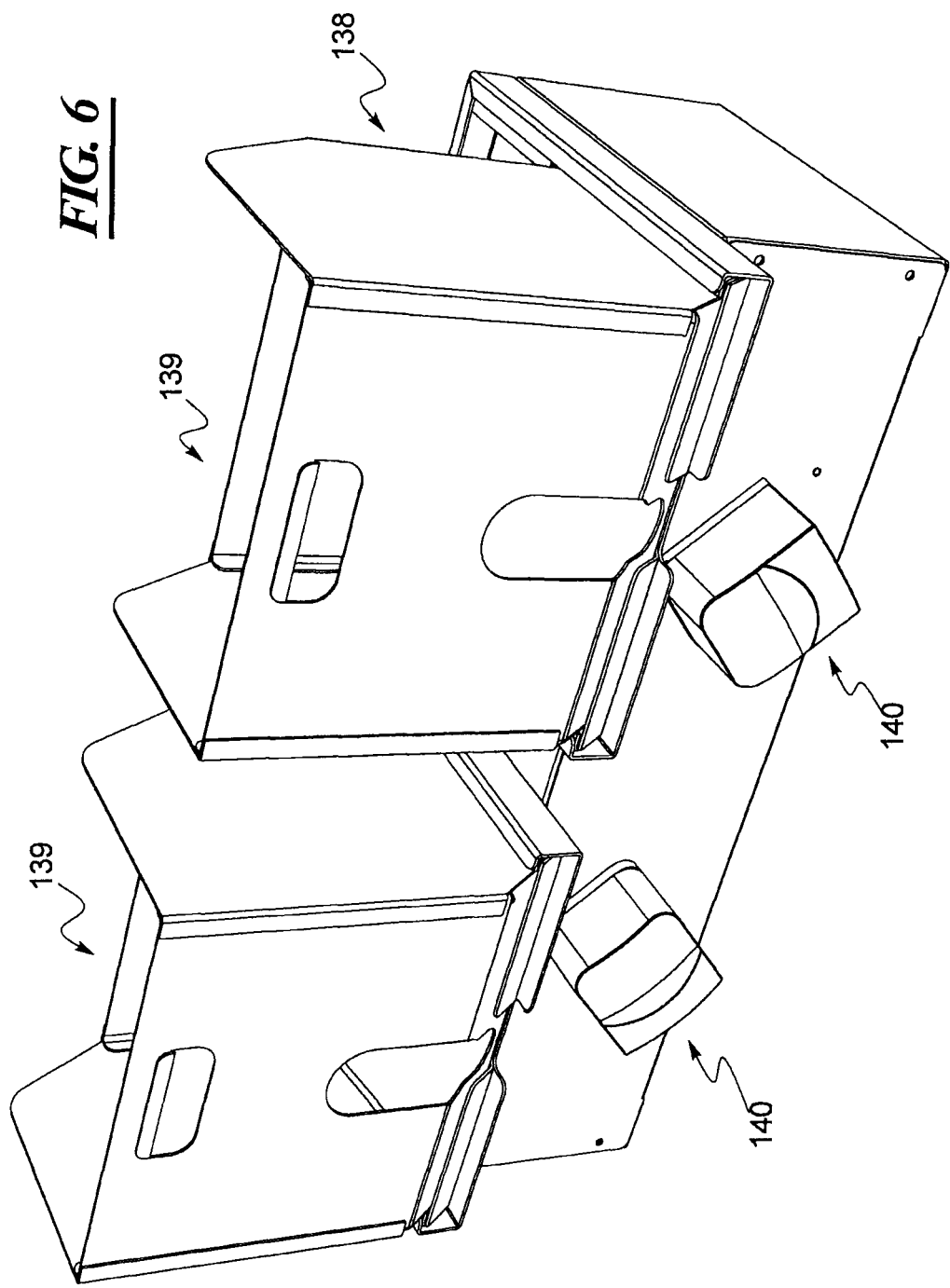

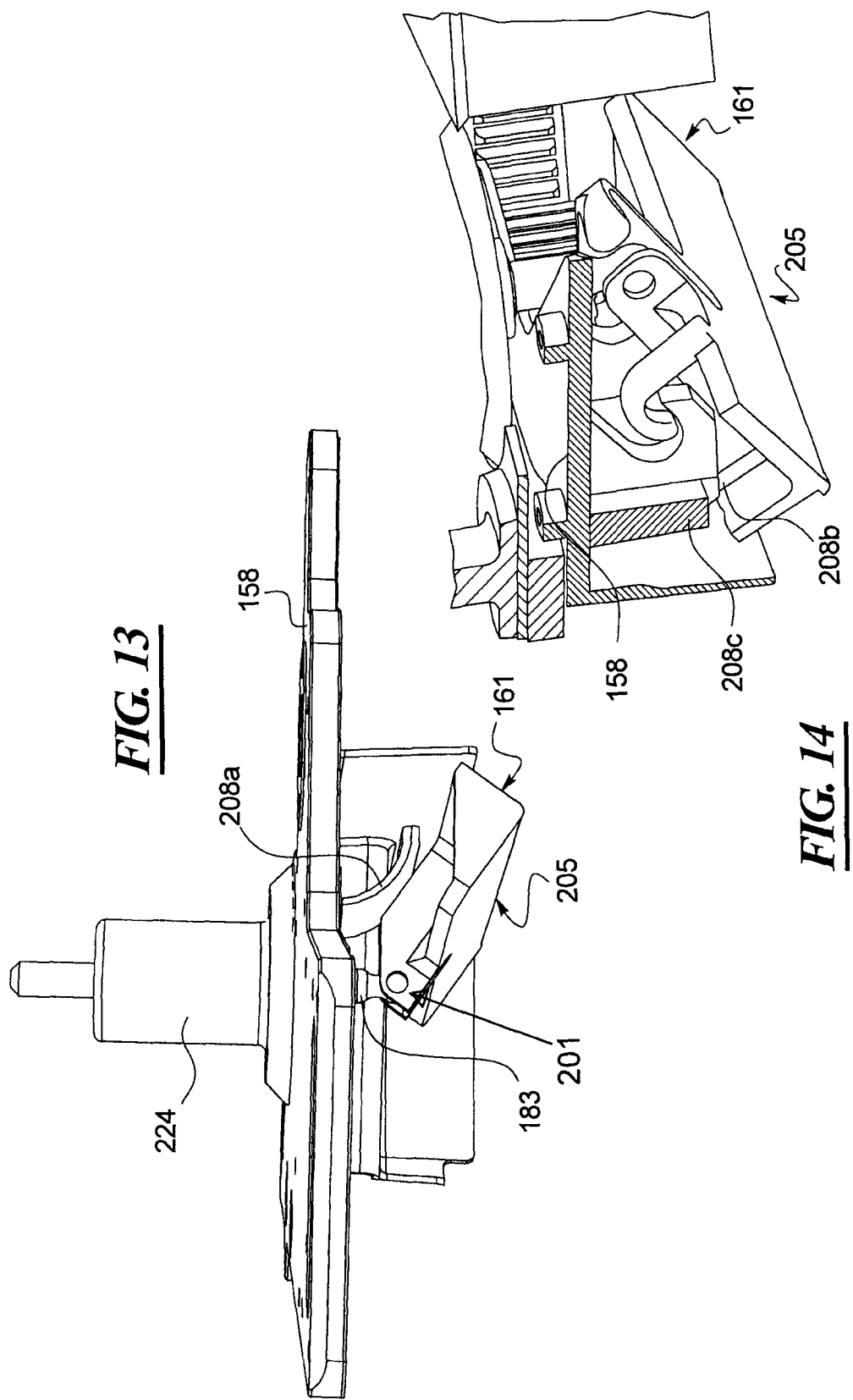

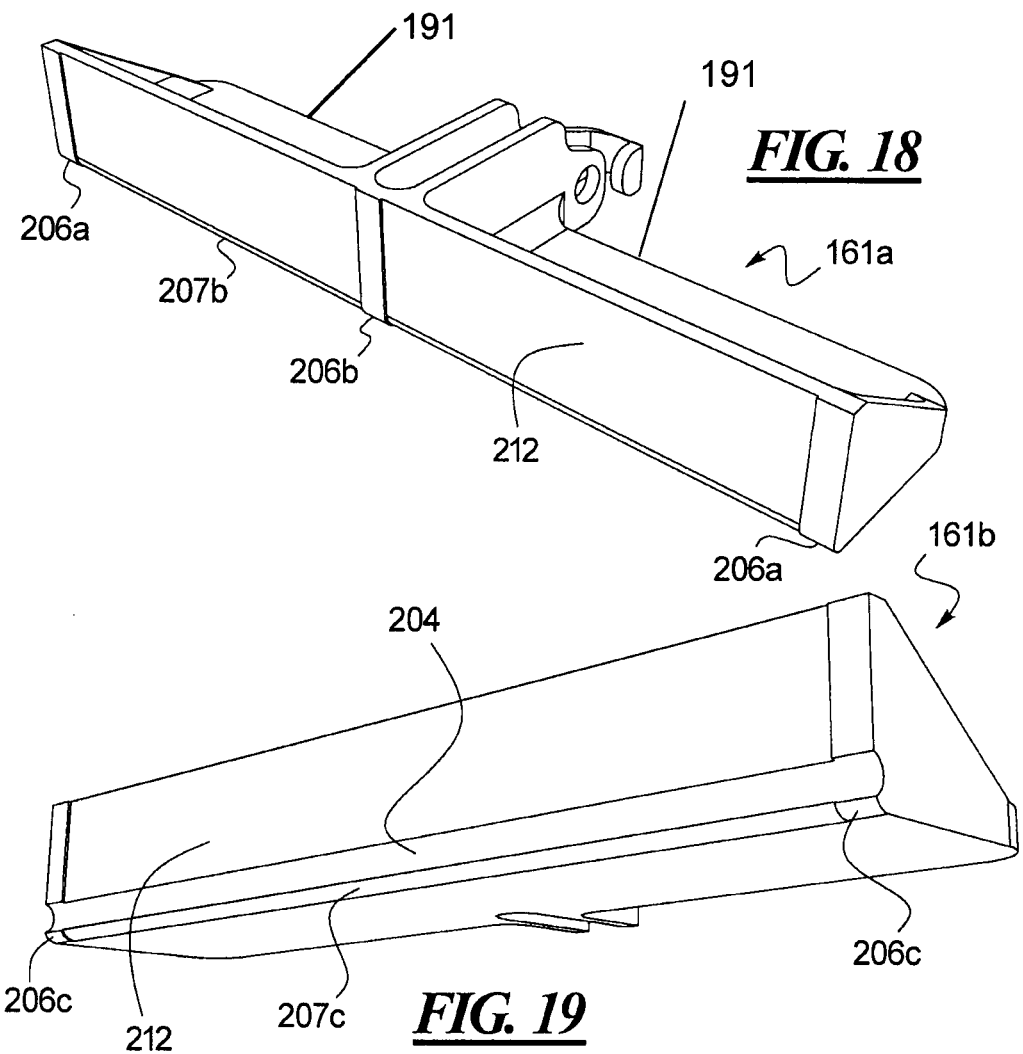
*FIG. 18*
*FIG. 19*
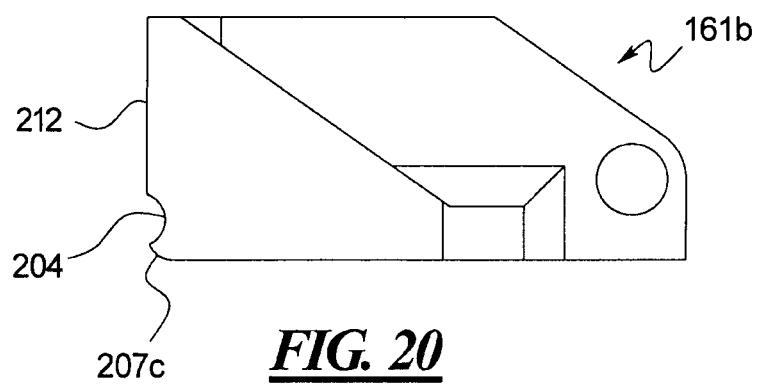
*FIG. 20*

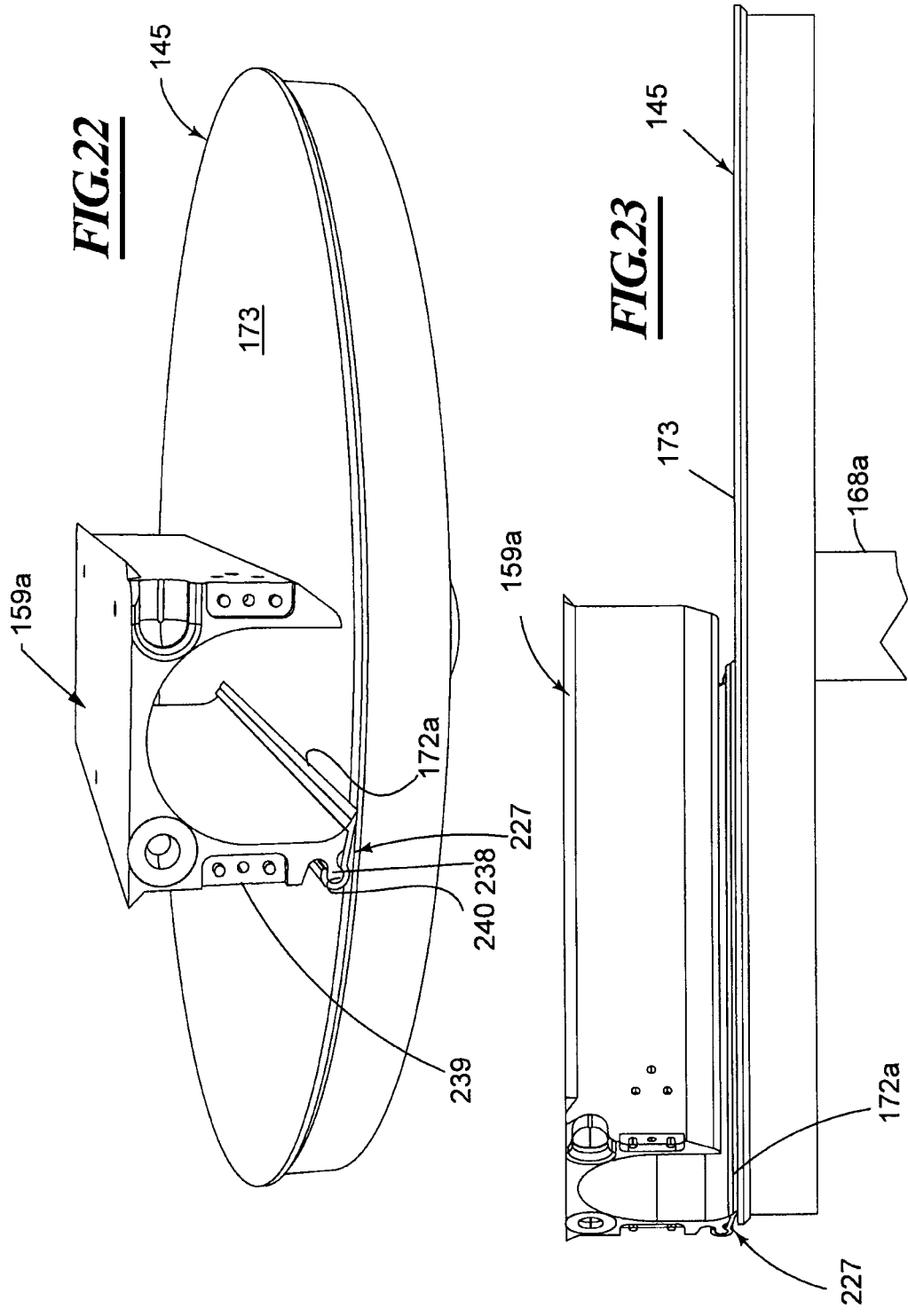

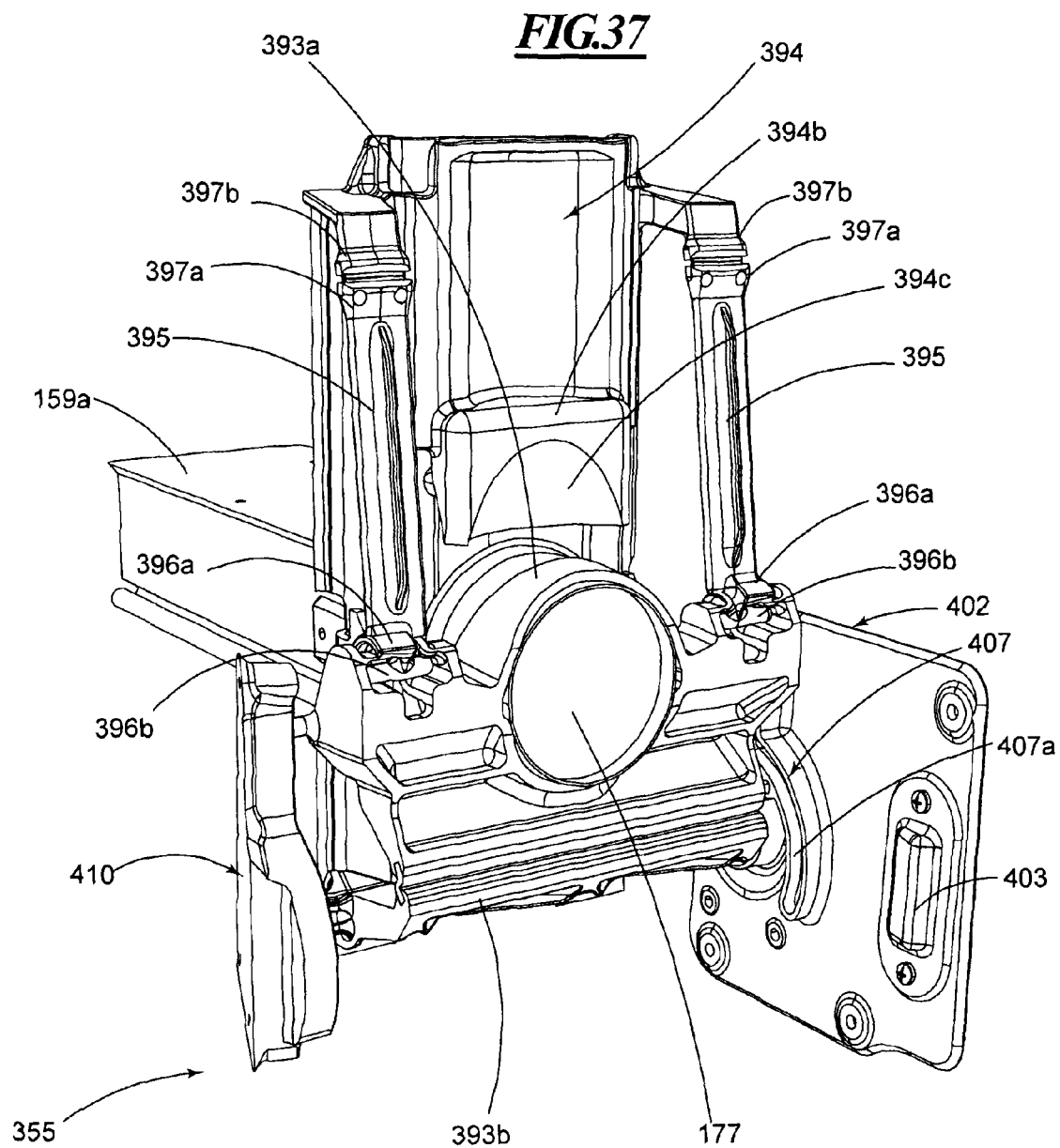

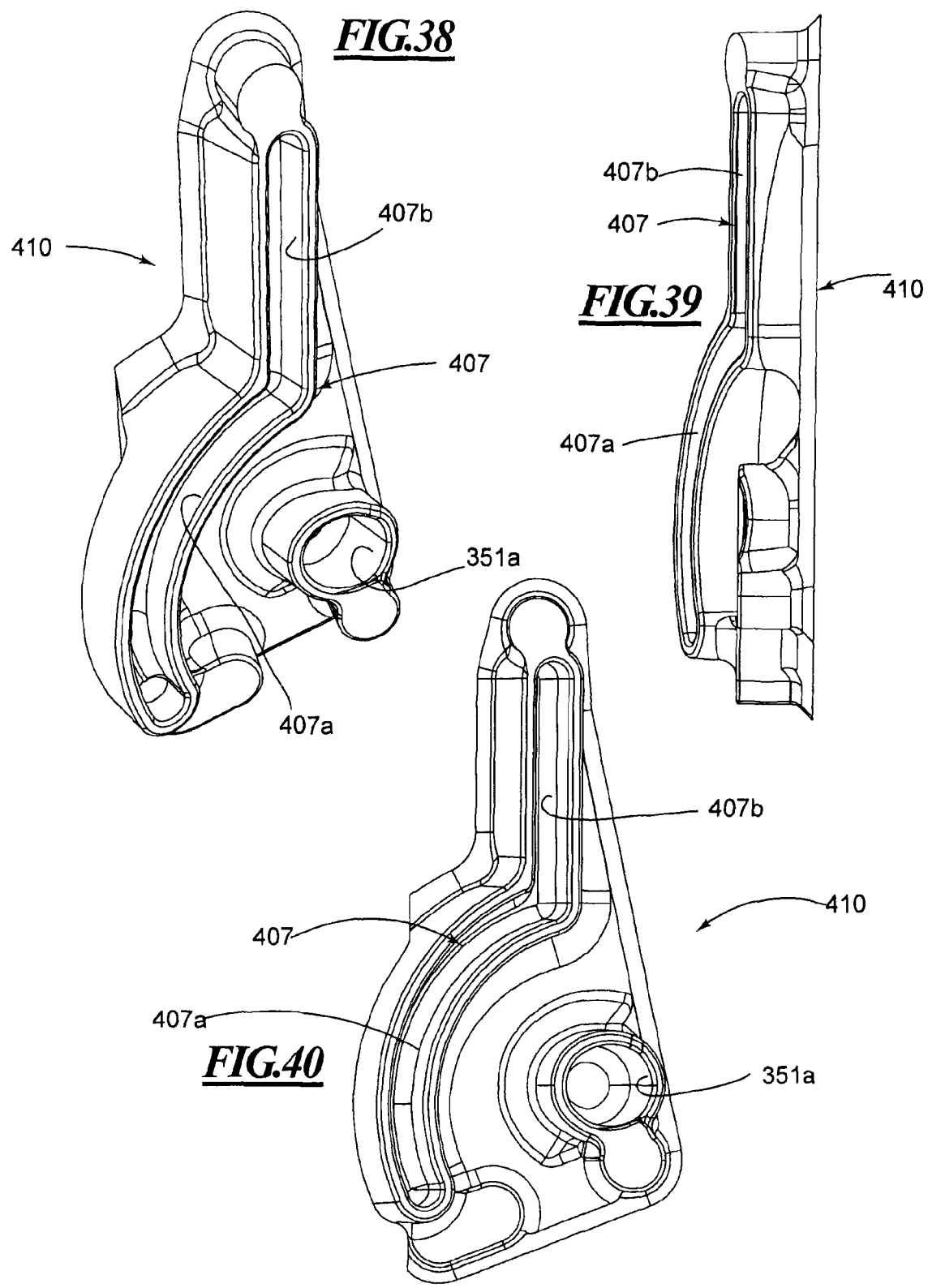

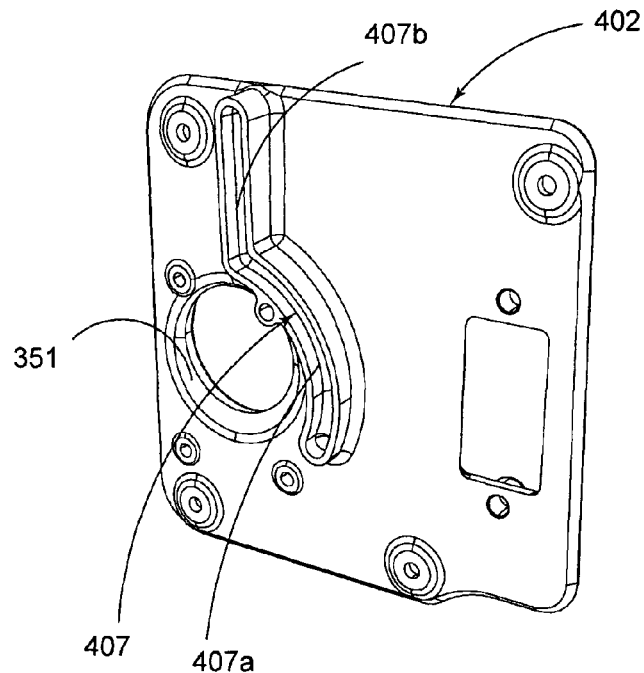
*FIG.41*
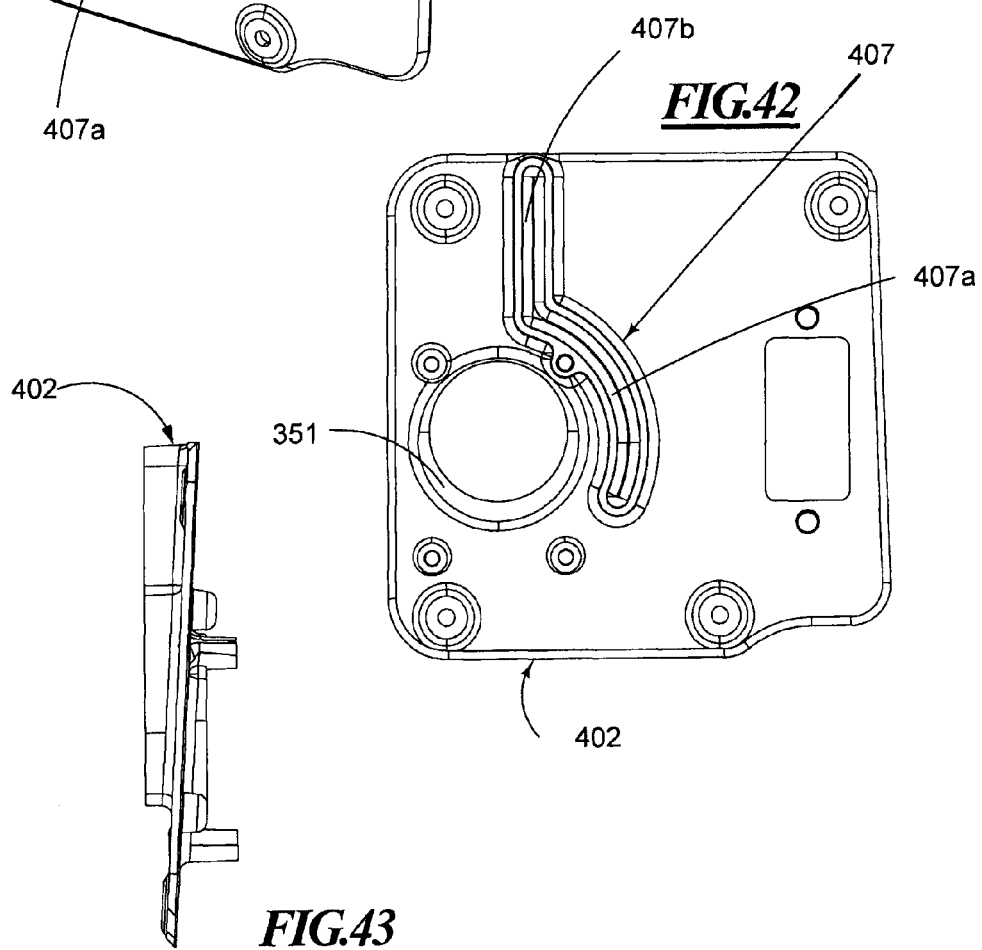
*FIG.42*
*FIG.43*

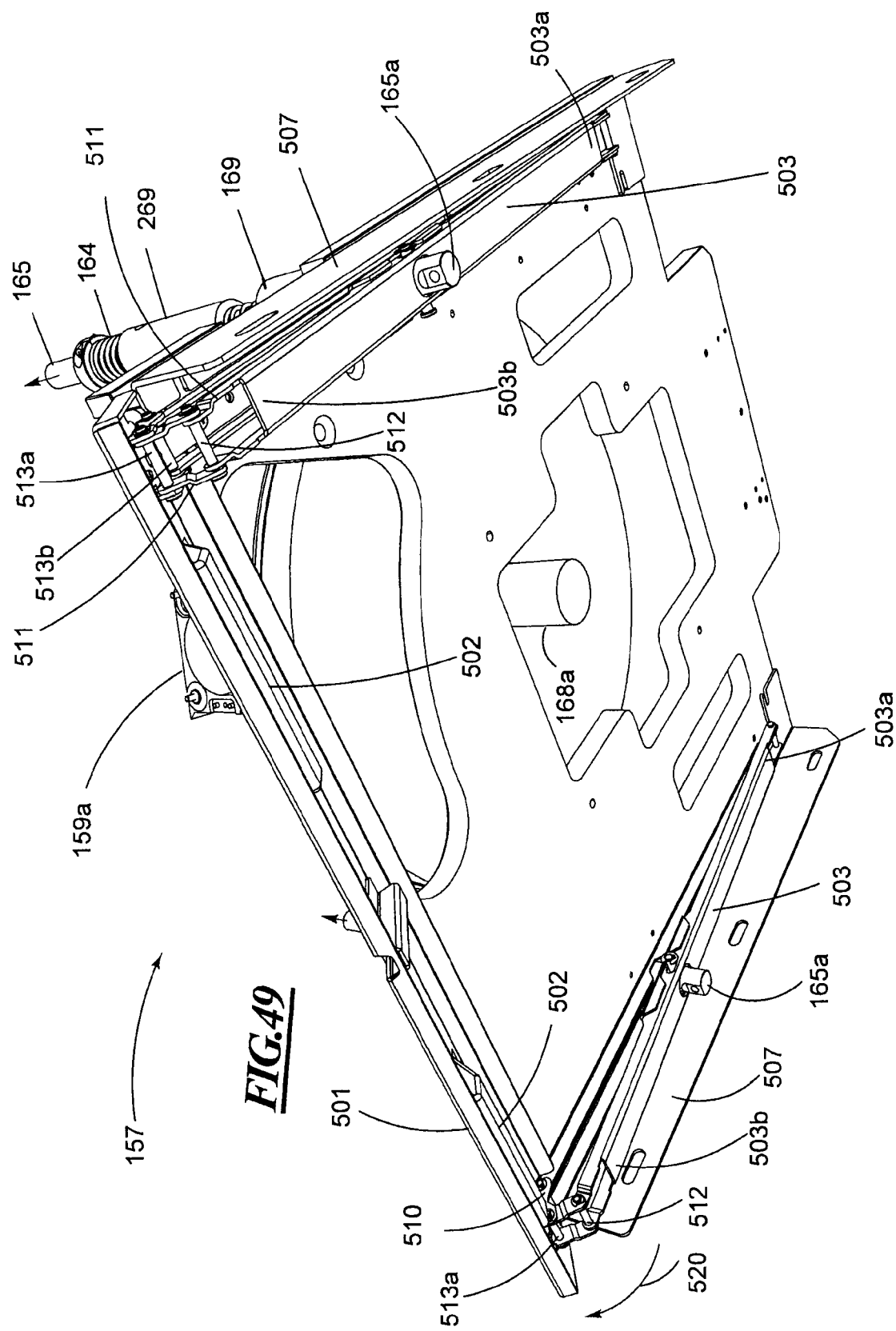

POINT OF SALE METHOD AND APPARATUS FOR MAKING AND DISPENSING AERATED FROZEN FOOD PRODUCTS

CROSS REFERENCE TO RELATED APPLICATIONS

This is a continuation-in-part of U.S. patent application Ser. No. 12/408,380, filed on Mar. 20, 2009, which claims priority to U.S. Provisional Application Ser. No. 61/095,051, filed on Sep. 8, 2008.

BACKGROUND

1. Technical Field

Point of sale methods and vending apparatuses are disclosed for producing and dispensing aerated frozen food products such as high quality ice cream and frozen yogurt.

2. Description of the Related Art

The preparation of ice cream and other aerated frozen food products requires the combining of a liquid slurry or mix with air while freezing the aerated slurry. The process of adding air to the mix is known as whipping. When the mix is whipped inside a freezer or at sufficiently low temperatures, tiny air cells are created. These air cells increase the volume of mix, and the additional volume produced is referred to as "overrun." The higher the overrun, the less ice cream and the more air will be in the product. Premium ice cream has a very low overrun. Thus, the quality of the finished ice cream product depends on the amount of overrun as well as the manner in which the aerated mix is frozen and dispensed.

Currently, most point of sale ice cream or frozen yogurt machines are limited to "soft serve"-type products and are usually dedicated to dispensing only one or two flavors of soft serve product and, in some cases, a combination of the two. For example, one soft serve machine will include two separate freezing chambers for making and dispensing chocolate and vanilla soft serve product. For other flavors, a second soft serve machine is required. The reason for the flavor limitation is that each freezing chamber contains a large volume of soft serve product intended for dispensing throughout the business day. In order to change or add new flavors, a freeze chamber must be emptied and cleaned before the new soft serve flavor can be made.

Another problem associated with point of sale soft serve machines relates to sanitation. As with any retail food appliance, the containers of pre-flavored mix from which the aerated soft serve product is made must be sanitary. The use of additional machines for providing more flavors increases the labor costs associated with sanitizing each machine. While high volume businesses have sales to justify the presence of several soft serve dispensing machines dispensing for a variety of products and flavors, many smaller businesses either cannot afford costs or labor associated with additional machines or do not have the floor space required for additional machines.

Further, because soft serve products are pre-made in quantities intended to last through the business day, most of the product remains in the chamber after formation and until it is dispensed hours later. Because soft serve ice cream or yogurt tastes better when it is fresh, the quality of the soft serve product may be compromised if sales are slow.

Point of sale soft serve machines are also difficult and time consuming to clean and maintain. Proper cleaning requires the machine to be purged of remaining product, and all interior walls, pumps and other parts that come into contact with the product must be cleaned and sanitized to prevent bacteria growth. Such cleaning operations are costly in terms of labor, down time, and product waste.

In addition to the problems associated with soft serve ice cream and frozen yogurt dispensers described above, there is a demand for traditional ice creams that cannot be made by a conventional soft serve dispensing machine. Traditionally, these higher-quality ice creams are produced in five gallon quantities thereby requiring an ice cream shop to have expensive elongated open-top freezers for the display and serving of the various ice cream flavors. While traditional ice creams with less overrun have a reasonably long shelf life, the cost of the freezers and the energy use can be prohibitive to many small businesses. To alleviate this problem, point-of-sale gourmet ice cream dispensing machines are being developed. U.S. Pat. No. 5,433,967 discloses a machine for making a single serving wherein the aerated product is frozen in and dispensed from a tube structure. U.S. Pat. No. 5,727,713 discloses a disposable conduit with an air mixing chamber and side branches for adding flavors. While not environmentally sound, the disposable conduit provides certain sanitary benefits.

US2006/0162348, US2006/0162347, U.S. Pat. No. 7,131,279, U.S. Pat. No. 7,052,728, U.S. Pat. No. 6,952,928 and U.S. Pat. No. 6,698,228, commonly assigned to MooBella LLC of Taunton, Mass., USA, all disclose point-of-sale ice cream vending machines that utilize a rotating horizontal freeze plate for the distribution of the aerated mix and various means for scraping the frozen aerated mix off of the freeze plate prior to placement of the frozen aerated mix into a container for the customer.

However, the above-described MooBella machines, while clearly providing advantages over the prior art, still suffer from several deficiencies. First, while the MooBella machines provide a more traditional ice cream product that serves as a distinct alternative to a soft serve product, the shape of the dispensed MooBella product is roughly in the form of an elongated cylinder, as opposed to a rounded scoop, like those served in traditional ice cream shops. Thus, the MooBella vending machines fall short of accurately imitating the look of scooped ice cream served by traditional ice cream shop. Second, the MooBella machines are difficult, time-consuming and therefore costly to sanitize at the end of each business day. Multiple parts must be disassembled, cleaned and reassembled. Therefore, a point-of-sale ice cream vending machine that is easier to sanitize in compliance with local health department codes is needed. Further, improvements in terms of air distribution and mixing, flavor distribution and mixing, solid material or "mix-ins" distribution and mixing as well as product delivery time or speed and dependability are also required. Finally, the MooBella machines that are currently available and disclosed in the above patents and published applications are not mechanically reliable and do not produce an ice cream product of consistent quality.

SUMMARY OF THE DISCLOSURE

In this disclosure, the above deficiencies are addressed and improved methods and apparatuses for producing and dispensing ice cream or aerated frozen confectionery products at a point-of-sale are disclosed.

One disclosed apparatus for making and dispensing frozen aerated products comprises a rotating horizontal freeze plate comprising an upper surface for receiving a chilled aerated mix thereon. The apparatus also comprises a scraper for scraping frozen aerated mix off of the rotating freeze plate. The scraper forms a channel for the collection of scraped, frozen and aerated mix. The apparatus also comprises a retractable plow for pushing the mix through the channel towards a cup held by a cup-holder of a cup-lifter mechanism disposed at an end of the channel. The cup-lifter mechanism comprises a frame with an opening in alignment with the channel. The cup-holder includes a rear end and a front end. The rear end is disposed between the frame and the front end and the rear end is coupled to a motor. The cup-holder is coupled to a door that covers the opening when the cup-lifter mechanism is in a first position. The door is movable to a second position above the opening with the cup-holder pivoted upward in alignment with and covering the opening with a cup when a cup is received in the cup-holder.

In a refinement, the front side of the cup-holder is coupled to the door and the door is slidably coupled to the frame.

In a refinement, the door comprises a wiper element for wiping the plow when the door moves from the second to the first position and when the plow is disposed at the opening in the frame after the plow has pushed the mix into the cup.

In a refinement, the frame comprises a rear wall in which the opening is disposed, the rear wall comprising a pair of spaced-apart tracks that are slidably coupled to the door.

In a refinement, the rear wall comprises a wiper element for cleaning a rear side of the door that faces the channel and plow.

In a refinement, the frame comprises a wiper element for cleaning a rear side of the door that faces the channel and plow.

In a refinement, the front end of the cup-holder is hingedly connected to the door by a pair of spaced-apart arms disposed on either side of the cup-holder.

In a refinement, the frame comprises a pair of sidewalls. Each sidewall comprises a shaped track including a lower arcuate portion and an upper vertical portion. The cup-holder comprises a pair of outwardly extending and oppositely directed pins. Each pin is slidably disposed in one of the shaped tracks. The lower arcuate portions of the shaped tracks cause the cup-holder and cup to pivot upward towards the opening and the vertical portions of the shaped tracks cause the cup-holder and cup to move vertically upward in alignment with the opening.

In a refinement, the frame comprises a pair of opposing side plates in which the shaped tracks are disposed.

In a refinement, the rear end of the cup-holder comprises a shaft with one end of the shaft coupled to the motor and the opposite end of the shaft rotatably coupled to the frame.

In a refinement, a home sensor is included for detecting when the cup-holder is in at least one of the first and second positions, the home sensor and motor being linked to a controller.

In a refinement, the scraper body is coupled to the frame.

In a refinement, the plow comprises a plow face that engages the mix. The plow face comprises a shingled cross-sectional profile to inhibit sticking of the scraped, frozen aerated portion to the plow face.

In a refinement, the frame further comprises an upwardly protruding cup support and the cup-holder comprises a ring to support a cylindrical or frusto-conically shaped cup within the ring. In the first position, the cup-holder is rotated downward so that a bottom panel of the cup engages the cup support to release frictional engagement between the cup and the ring.

One disclosed method for making ice cream at a point of sale vending machine comprises: rotating a freeze plate; starting a first air compressor; starting first and second pumps; pumping a stream of chilled base with the first pump; injecting air into the stream of chilled base with the first air compressor to provide a stream of aerated chilled base; injecting at least one flavor into the stream of aerated chilled base with the second pump to provide a stream of aerated mix; delivering the stream of aerated mix onto the rotating freeze plate; while the freeze plate rotates, spreading the aerated mix onto a portion of the rotating freeze plate; while the freeze plate rotates, scraping the frozen aerated mix off of the freeze plate with a scraper that forms a channel that extends radially across the freeze plate; accumulating scraped frozen aerated mix in the channel; opening a door to the channel by rotating a cup towards the channel and vertically upward into position at an end of the channel; forming a rounded scoop-like portion from the accumulated scraped frozen aerated mix by extending a plow though the channel; pushing the scoop-like portion into the cup with the plow; moving the cup vertically downward to dislodge the scoop-like portion from the plow and pivoting the cup downward to an upright position for retrieval by a consumer.

Another disclosed apparatus for making and dispensing frozen aerated products comprises a rotating horizontal freeze plate comprising an upper surface for receiving a chilled aerated mix thereon. The apparatus comprises a scraper for scraping frozen aerated mix off of the rotating freeze plate. The scraper forms a channel for the collection of scraped, frozen and aerated mix. The apparatus also includes a plow for pushing the mix through the channel towards a cup held by a cup-holder disposed at an end of the channel. The scraper is biased against the upper surface of the freeze plate by a hold-down plate when the hold-down plate is in a clamped position.

In a refinement, the hold-down plate is coupled to and extends between two vertical posts disposed on diametrically opposed sides of the freeze plate. Each post is coupled to a lever. The lever moves the posts and hold-down plate from a released position where the hold-down plate and scraper can be removed for cleaning to the clamped position for fabricating scraped, frozen and aerated mix.

In a refinement, the posts are each coupled to a pivoting bracket. The pivoting brackets are coupled to the lever. The brackets are disposed beneath the freeze plate.

In a refinement, the posts are biased in an upwardly direction.

In a refinement, the pivoting brackets each comprise a proximal end and a distal end. The proximal ends of the pivoting brackets are pivotally coupled to a fixed proximal axis. The distal ends of the pivoting brackets are each coupled to fixed distal axes by two coupling members and three pins thereby forming triple pivot connections between the distal ends of the pivoting brackets and the distal fixed axes.

In a refinement, the pivoting brackets lock in the clamped position.

In a refinement, the posts are each coupled to a clamp that each frictionally receive an end of the hold-down plate.

In a refinement, the apparatus further comprises a spreader body for distributing the chilled aerated mix on the rotating freeze plate prior to the mix engaging the scraper. The spreader body may be mounted beneath the hold-down plate.

In a refinement, the scraper is coupled to the cup holder and, when the hold-down plate is in the released position, the cup holder and scraper can be removed for cleaning and the hold-down plate and spreader body can be removed for cleaning.

In a refinement, the spreader body further comprises a cleaning edge and a spreading edge. The spreader body is pivotally coupled to a rod passing through the hold-down plate. The spreader body is movable between a spreading position where the spreading edge engages the upper surface of the freeze plate and a cleaning position where both the cleaning edge and spreading edge engage the upper surface of the freeze plate.

In a refinement, the spreading edge comprises a spreader blade disposed between two rounded end supports. The spreader blade is recessed with respect to the rounded end supports wherein, in the spreading position, the spreader blade is supported above the upper surface of the freeze plate by the rounded end supports.

In a refinement, when the spreader body moves from the cleaning position to the spreading position, the rod moves vertically upward causing the cleaning edge to pivot upward away from the freeze plate as at least one biasing member holds the spreading edge against the upper surface of the freeze plate in both the spreading and cleaning positions.

In a refinement, the freeze plate, scraper and plow are disposed within a liner, the liner comprising a drain for the release of cleaning water and debris.

Another disclosed method for making ice cream at a point of sale vending machine, the method comprises: clamping a spreader and a scraper onto an upper surface of a rotatable freeze plate so that the spreader and scraper each extend radially across a portion of the freeze plate in a spaced-apart fashion, the scraper further comprising a body that forms a channel that extends radially above the freeze plate; rotating the freeze plate; providing a stream of chilled base; injecting air into the stream of chilled base to provide a stream of aerated chilled base; injecting one or more flavors into the stream of aerated chilled base to provide a stream of aerated mix; delivering the stream of aerated mix onto the rotating freeze plate between the spreader and the scraper; spreading the aerated mix onto the rotating freeze plate with the spreader to provide a layer of frozen aerated mix; scraping the frozen aerated mix off of the freeze plate with the scraper; accumulating scraped frozen aerated mix in the channel; forming a rounded portion from the accumulated frozen aerated mix by extending a plow though the channel towards a cup held in place by a cup-lifter mechanism and pushing the rounded portion into the cup.

Another disclosed apparatus for making and dispensing frozen aerated products comprises a rotating horizontal freeze plate with an upper surface for receiving a chilled aerated mix. The chilled aerated mix comprises, in one embodiment, ice cream base that has been sufficiently aerated and combined with one or more flavors. The horizontal freeze plate rotates about its central axis. The apparatus also comprises a spreader body for distributing the chilled aerated mix on the rotating freeze plate. The spreader body extends radially across at least a portion of the upper surface of the freeze plate. The apparatus further comprises a scraper for scraping frozen aerated mix off of the rotating freeze plate. The scraper comprises a scraper blade with a leading edge that extends radially across the portion of the freeze plate and that engages the upper surface of the freeze plate. The scraper blade is directed opposite the direction of rotation of the freeze plate. The scraper further comprises a body that forms an elongated semi-cylindrical channel above the scraper blade that extends radially across the freeze plate for the collection of scraped, frozen and aerated mix. The apparatus also comprises a plow for pushing the scraped, frozen and aerated mix through the channel towards a cup held by a cup-lifter mechanism disposed at an end of the channel. The action of the plow pushing the scraped frozen aerated mix through the channel and directly into the cup results in a generally round scoop of scraped frozen aerated mix in the cup that closely resembles a serving scoop experienced at a traditional ice cream shop.

In a refinement, the scraper is biased against the upper surface of the freeze plate by a hold-down plate. In further refinement of this concept, the hold-down plate is coupled to and extends between two vertical posts disposed on diametrically opposed sides of the freeze plate. Each post may be coupled to a vertical cam. The vertical posts and consequently, the hold-down plate, may be biased upward by a pair of springs. The vertical cams move the posts and hold-down plate from a released (upward) position for disassembly and cleaning to a clamped (downward) position for making the scoop.

In a further refinement, the vertical cams are disposed beneath the freeze plate and are linked together by a pulley and lever system so both cams can be moved simultaneously from the released to the clamped positions and vice versa upon the movement of the lever.

In another refinement, the cup-lifter mechanism comprises a cup-holder that, in turn, comprises a front side and a rear side. The rear side of the cup-holder is pivotally coupled to a frame. The frame comprises an opening in alignment with the channel of the scraper. The front side of the cup-holder is linked to a door that covers the channel when the cup-lifter mechanism is in a first position. The door is slidably coupled to the frame and movable to a second position above the opening which causes the cup-holder to pivot upward in alignment with and covering the opening with a cup when a cup is received in the cup-holder.

In a refinement, the door of the cup-lifter mechanism includes a lower edge that is used to dislodge a scoop from the plow in the event the scoop adheres to the face of the plow as it is been pushed into the cup by the plow. In operation, the plow is extended to push the scraped, aerated frozen mix towards the cup to form a scoop. Once the plow is in the fully extended position, movement of the plow and cup is delayed for predetermined period of time. The plow is then retracted partially and the door is partially lowered so that the lower edge of the door engages any product that may be adhering to the face of the plow. After dislodgement, the plow is refracted to a cleaning position where the door is lowered fully and wiper elements on the door clean the face of the plow as the door proceeds downward to the closed position. The plow is then fully retracted back through the channel in preparation for the next dispense.

Other means for dislodging of frozen ice cream scoop from the plow face include using air pressure, a flexible plow face, a plow face that includes an expandable bladder, a plow face with an expandable/retractable piston member and/or heated plow face.

In a refinement, the gap between the spreader blade and the upper surface of the freeze plate (provided by the rounded end supports and optional middle support) is about 0.012" (0.30 mm) when the spreader body is in the spreading position thereby providing for a 0.012" thick layer of aerated mix on the freeze plate. However, with the gap thickness can vary. For example, the gap thickness can be less than 0.012" and additional rotations of the freeze plate may be required to produce an adequate serving size. Alternatively, a gap thickness of greater than 0.012" may be employed in fewer rotations of the freeze plate may be required to produce an adequate serving size. Those skilled in the art will be aware that the gap thickness or aerated mix layer thickness, freeze plate temperature, freeze plate speed and qualities of the aerated mix may all be varied to produce the desired results.

In a refinement, when the spreader body moves from the cleaning position to the spreading position, the rod moves vertically upward thereby causing the cleaning edge to pivot upward away from the freeze plate as the spreader body engages an abutment, resilient member or spring biased member that holds the spreading edge against the upper surface of the freeze plate in the spreading and cleaning positions. In one refinement, magnets of opposing polarities are used to bias the spreader edge of the spreader body against the freeze plate in both the spreading and cleaning positions.

In a refinement, the apparatus comprises a skeleton frame. The frame supports a first insulated compartment for the storage of base material of the mix. The first insulated compartment is in communication with a compressor for maintaining the first insulated compartment within a first temperature range. The frame also supports a second insulated compartment for accommodating the freeze plate, scraper, spreader body and plow (i.e., the "product fabrication module"). The second insulated compartment is in communication with the compressor for maintaining the second insulated compartment within a second temperature range. The freeze plate is linked to its own dedicated compressor or "chiller." The frame also supports a third compartment for accommodating liquid flavorings and solid "mix-in" materials (e.g., candy, granola, chocolate, etc.). Typically, the third compartment may be maintained at a higher temperature (e.g., 55° F.±5° F.; 12.8°±2.8° C.) than the first and second compartments (e.g., 36° F.±3° F.; 2.2° C.±1.7° C.). As a result, the third compartment may not require a separate compressor and baffles may be employed to control the flow of chilled air between the first, second and third compartments. Preferably, one compressor may be employed to cool all three compartments that are in need of cooling.

By way of example only, the first compartment that accommodates the base materials may be conveniently disposed towards the bottom of the frame and maybe in direct and primary communication with the compressor. The second compartment houses the ice cream fabrication equipment may be disposed on top of the first compartment. One or more baffles may be employed to provide the airflow to between the first and second compartments. The flavors and mix-in materials may be disposed in the third compartment above the second compartment. Baffles and conduits may be employed to provide controlled communication of chilled air between the first and third compartments in between the second and third compartments.

Further, it is desirable to control humidity in the second and third compartments. Thus, these compartments may be vented to the atmosphere and a desiccant module may be employed in at least the second compartment for humidity and frost reduction. The desiccant module may be employed to reduce the humidity of chilled air exchange between the second and third compartments The skeleton frame also supports an additional compartment for accommodating electronic components. This additional compartment preferably comprises a vent for releasing heat.

In another refinement, the second compartment is coupled to a blower by a one-way valve permitting air from the blower to enter the second compartment from the blower. The second compartment further comprises an outer window that isolates the second compartment and maintains the second compartment at a pressure greater than one atmosphere during the making of the scoop of frozen, scraped aerated mix.

Another disclosed method for making and dispensing ice cream at a point of sale vending machine comprises: rotating a freeze plate; providing a stream of chilled base; injecting air into the stream of chilled base to provide a stream of aerated chilled base; injecting one or more flavors into the stream of aerated chilled base to provide a stream of aerated mix; delivering the stream of aerated mix onto the rotating freeze plate; spreading the aerated mix onto a portion of the rotating freeze plate with a spreader body that extends radially across the portion of the freeze plate to provide a layer of frozen aerated mix; scraping the frozen aerated mix off of the freeze plate with a scraper that comprises a scraper blade with a leading edge that extends radially across the portion of the freeze plate and that engages the freeze plate and is directed opposite a direction of travel of the freeze plate, the scraper further comprising a body that forms an elongated semi-cylindrical channel above the scraper blade and that extends radially above the freeze plate; accumulating scraped frozen aerated mix in the channel; and, forming a rounded portion from the accumulated frozen aerated mix by extending a plow though the channel towards a cup held in place by a cup-lifter mechanism.

Yet another disclosed method comprises: rotating a freeze plate; starting a first air compressor; starting first and second pumps; pulling a spreader body and scraper downward and into engagement with the rotating freeze plate; pumping a stream of chilled base with the first pump; injecting air into the stream of chilled base with the first air compressor to provide a stream of aerated chilled base; injecting at least one flavor into the stream of aerated chilled base with the second pump to provide a stream of aerated mix; delivering the stream of aerated mix onto the rotating freeze plate in front of the spreader body; while the freeze plate rotates, spreading the aerated mix onto a portion of the rotating freeze plate with the spreader body that extends radially across the portion of the freeze plate to provide a layer of frozen aerated mix; while the freeze plate rotates, scraping the frozen aerated mix off of the freeze plate with a scraper that comprises a scraper blade with a leading edge that extends radially across the portion of the freeze plate and that engages the freeze plate and is directed opposite a direction of travel of the freeze plate, the scraper further comprising a scraper body that forms an elongated semi-cylindrical channel above the scraper blade and that extends radially above the freeze plate; accumulating scraped frozen aerated mix in the channel; shutting off the first and second pumps and air compressor; tilting the spreader body downward so that a cleaning edge of the spreader body engages the rotating freeze plate; stopping the rotation of the freeze plate; tilting a cup into position at an end of the channel opposite along a periphery of the freeze plate for receiving accumulated scraped frozen aerated mix; forming a rounded scoop-like portion from the accumulated frozen aerated mix by extending a plow though the channel to push the accumulated frozen aerated mix towards the cup; wiping the plow; retracting the plow back through the channel; and, tilting the cup back to an upright position.

In a refinement, the spreading of the aerated chilled mix occurs over about ⅔ of a rotation of the freeze plate.

In a refinement, the scraping of the frozen aerated mix occurs over about ⅓ of a rotation of the freeze plate.

In another refinement, the entire ice cream scoop fabrication/dispensing/freeze plate cleaning operation can be performed in about three rotations of the freeze plate.

Other advantages and features will be apparent from the following detailed description when read in conjunction with the attached drawings.

BRIEF DESCRIPTION OF THE DRAWINGS

For a more complete understanding of the disclosed methods and apparatuses, reference should be made to the embodiments illustrated in greater detail in the accompanying drawings, wherein:

FIG. 4 and FIG. 5 are perspective views of the refrigeration module disposed above the flavor module;

FIG. 6 is a perspective view of the base storage module and associated pumps;

FIG. 13 is a side view illustrating an alternative arrangement for the spreader assembly which includes a resilient biasing member for biasing the rear spreading end of the spreader body against the freeze plate;

FIG. 14 is a side view illustrating an alternative arrangement for the spreader assembly which includes two pairs of opposing magnets, one magnet of each pair associated with the cover and another magnet of each pair associated with the rear spreading end of the spreader body, for biasing the rear spreading end of the spreader body against the freeze plate;

FIG. 18 is a front perspective view of another disclosed spreader body which features a middle support or foot in addition to the two rounded end supports;

FIG. 19 is a rear perspective view of yet another disclosed spreader body with a recess extending along the rear edge of the spreader body for avoiding the accumulation of waste material;

FIG. 20 is an end view of the spreader body shown in FIG. 19;

FIG. 22 is a perspective view of one disclosed scraper body engaging the rotating freeze plate;

FIG. 23 is a plan view of the scraper body and freeze plate illustrated in FIG. 22;

FIGS. 36-37 are additional front perspective views of the cup-lifter mechanism illustrated in FIGS. 32-33 and 38-43 with the cup-holder in the up position ready to receive a product portion delivered by the plow through the scraper body;

FIGS. 38-40 are various perspective views illustrating the left guide for controlling the movement of the cup-lifter mechanism, wherein the left guide is disposed on the left side of the cup-lifter mechanism illustrated in FIGS. 32-37;

FIGS. 41-43 are various perspective views of the right guide for controlling the movement of the cup-lifter mechanism, wherein the right guide is disposed on the right side of the cup-lifter mechanism illustrated in FIGS. 32-37;

FIG. 49 is another bottom perspective view of the hold-down mechanism illustrated in FIGS. 41-42 illustrating movement of the front lever upward to unlock or unclamp components of the product fabrication module for routine cleaning unit sanitization.

It should be understood that the drawings are not necessarily to scale and that the disclosed embodiments are sometimes illustrated diagrammatically and in partial views. In certain instances, details which are not necessary for an understanding of the disclosed methods and apparatuses or which render other details difficult to perceive may have been omitted. It should be understood, of course, that this disclosure is not limited to the particular embodiments illustrated herein.

DETAILED DESCRIPTION OF THE PRESENTLY PREFERRED EMBODIMENTS

Figure 1:
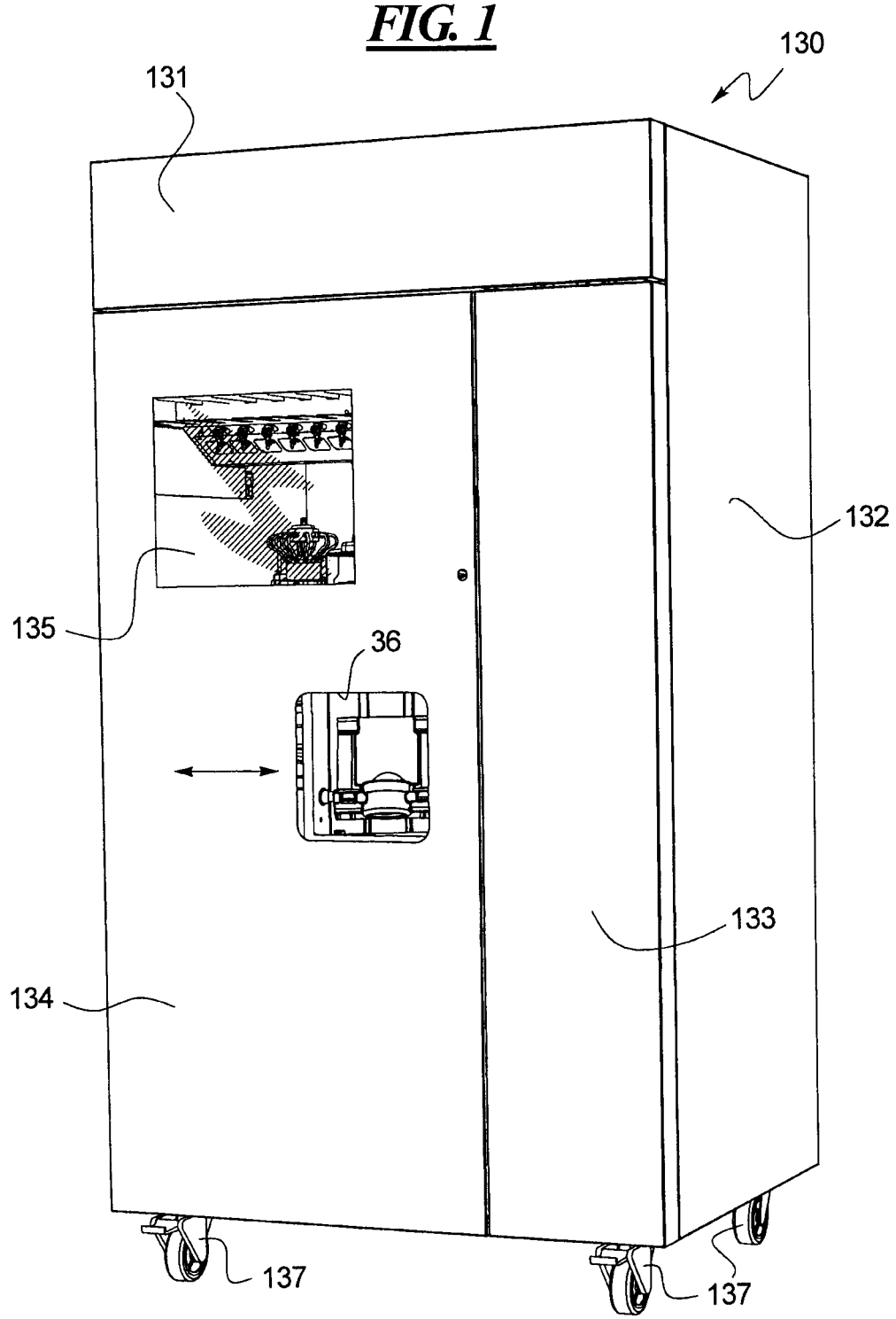
FIG. 1 is a left front perspective view of a stand-alone ice cream making and dispensing machine made in accordance with this disclosure and intended for use in a retail setting.
Figure 2:
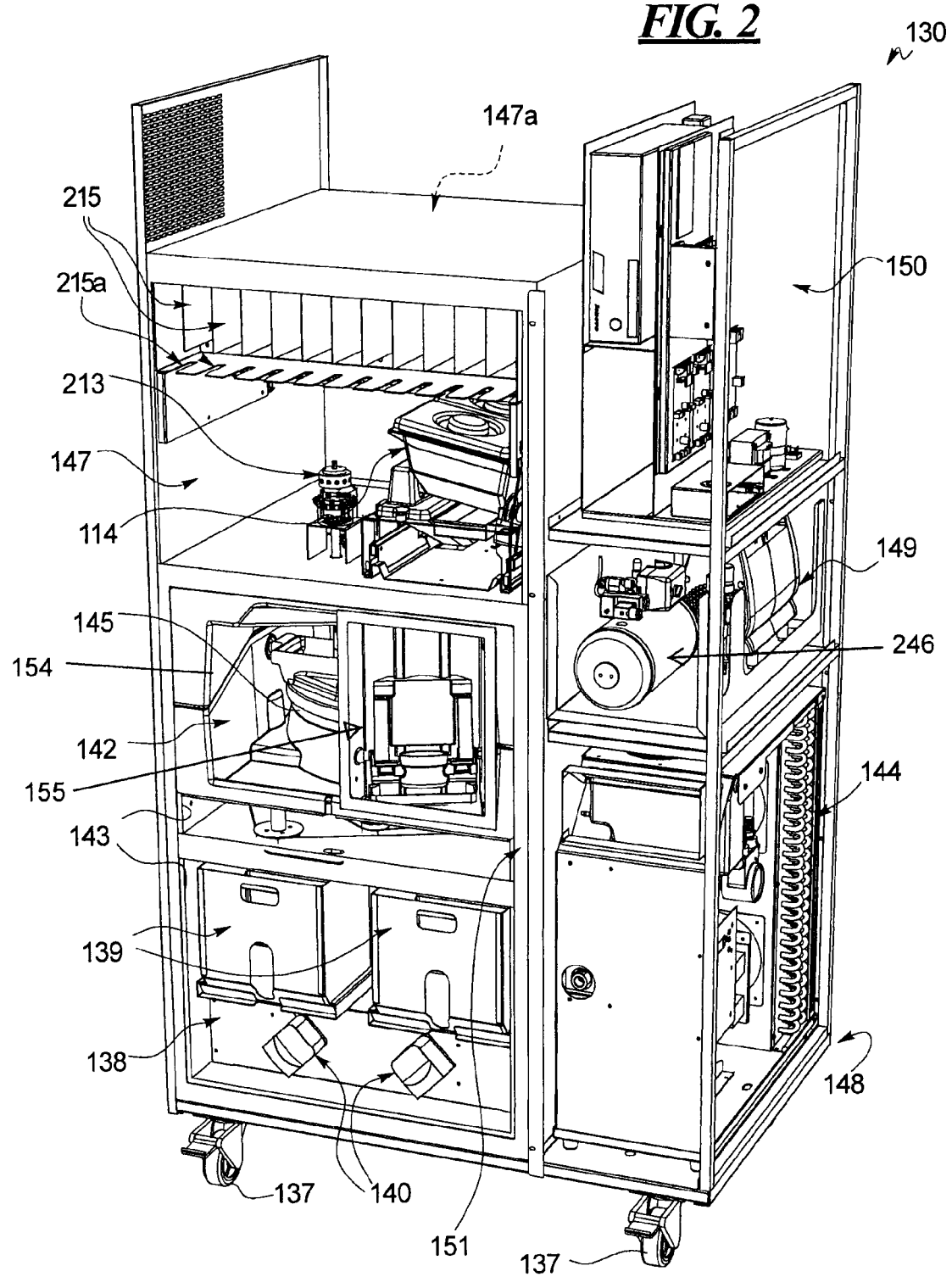
FIG. 2 is another perspective view of the machine illustrated in FIG. 1 with the outer housing panels removed and revealing the flavor module, the product fabrication module, the lower base storage module, the chiller module, the air compressor module and the electronics control module.

Turning first to FIG. 1, a stand-alone ice cream/frozen yogurt fabricating and dispensing machine 130 is illustrated and that is designed for a retail setting. The machine 130 includes outer panels 131-134 as shown in FIG. 1 which cover a skeleton frame structure as illustrated in FIG. 2. The panel 134 serves as a door with an operations viewing window 135 and a sliding access door/window 136 which provides either automated or manual access to the cup-lifter/serving dispenser mechanism 155 as described below. Wheels 137 may be provided to facilitate installation and movement of the machine 130 and for cleaning the floor beneath the machine 130. The daily maintenance/sanitization practices will be described below in connection with FIGS. 27-28 and 46-49.

FIG. 2 illustrates the skeleton frame and modular structure of the dispenser 130. A lower compartment or module 138 accommodates base containers 139 and pumps 140 used to deliver base to the product fabrication module or "product fabrication module" compartment 142. The modules/compartments 138/142 are insulated and chilled by at least one dedicated compressor 146 shown in FIGS. 4-5. The base materials are preferably maintained at a temperature of less than about 40° F. (4.4° C.). Accordingly, the base compartment 138 and product fabrication module compartment 142 are preferably maintained at temperatures of less than about 40° F. (4.4° C.). An ideal temperature range for both of these compartments 138, 142 is 36° F.±3° F. (2.2° C.±1.7° C.). Thus, the compartments or modules 138, 142 are provided with insulation shown schematically at 143. The upper compartment 147 accommodates the liquid flavors, pumps and solid "mix-in" materials. The compartment 147 should also be cooled, but to within a temperature range that is higher than the temperature range of the compartments 138, 142. A suitable temperature range for the upper compartment 147 is 55° F.±5° F. (12.8°±2.8° C.). The refrigeration module 147a that is disposed on top of the flavor module (FIG. 2; see also FIGS. 4-5) cools the compartments 138, 142, 147.

Figure 3:
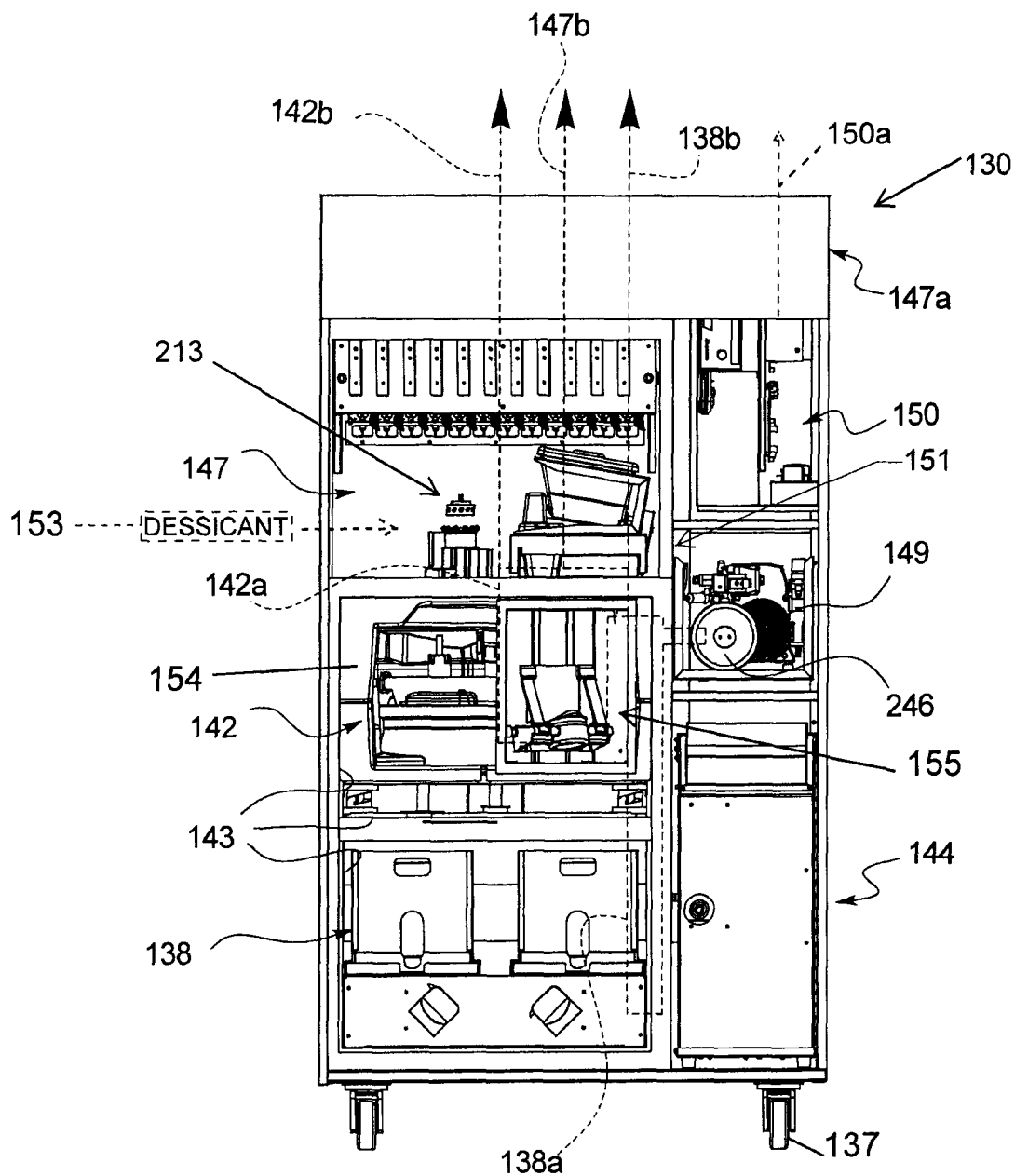
FIG. 3 is front plan view of the machine illustrated in FIG. 1 with the outer housing panels removed and the chilled air circulation and warm air venting paths shown schematically.

A chiller mechanism 144 provides liquid coolant to the rotating freeze plate 145. A suitable temperature for the freeze plate is about 10° F. (−12° C.). The compressor 146 and evaporator 146a of the refrigeration module 147a (FIGS. 4-5) is used for cooling the compartments 138, 142 (~33-39° F.; ~0.6°~3.9° C.) as well as the flavor module 147 (~50-60° F.; 10°-16° C.). Referring to FIGS. 2-3, the compressor 246 of the module 149 is used to aerate the chilled base material and/or chilled base/flavor mix. The electronics/control module is shown at 150 in FIGS. 2 and 7.

Returning to FIGS. 2-5, the compressor 146/evaporator 146a of the refrigeration module 147a is used to cool air that is delivered to the lower base compartment 138 and to the middle compartment 142 that houses the product fabrication components (i.e., "the product fabrication module 142"). Chilled air is also communicated to the upper compartment 147 that houses the flavorings and solid mix-in materials. However, the air used to cool the compartment 147 may be communicated from the middle and lower compartments 142, 138. One suitable airflow scheme is illustrated in FIG. 3.

Specifically, chilled air is communicated to the lower compartment 138 from the refrigeration module 147a as indicated by the flow path 138a in FIG. 3. Eventually, at least some of the chilled air is vented to the atmosphere as indicated by the flow path 138b. A portion of the chilled air from the flow path 138a may be communicated to the upper compartment 147. Similarly, chilled air is communicated from the refrigeration module 147a to the middle compartment 142 as indicated by the flow path 142a. Eventually, at least some of this chilled air is vented to the atmosphere as indicated by the flow path 142b and some of the chilled air from the flow path 142a may be directed to the middle compartment 147. The air that is eventually vented from the compartment 147 is indicated by the flow path 147b and the chilled air that is supplied to the compartment 147 may be a combination of chilled air from one or both of the compartments 138, 142. Suitable baffles (not shown) may be used in the flow paths 138a, 138b, 142a, and 142b, 147b to achieve the desired temperature ranges within the various compartments 138, 142, and 147. The operation of the baffles may be controlled by the electronics module 150. The working components disposed in the modules 148, 149, 150 generate heat and therefore insulation is preferably provided along the vertical wall shown generally at 151 in FIGS. 2-3 and preferably, one or more heat release conduits or chimneys are provided to release heat out the top of the machine 130 as indicated by the flow path 150a in FIG. 3.

As shown in FIG. 3, a single insulated compartment may be provided for accommodating the base module 138 and the product fabrication module 142. Preferably, a desiccant canister 153 is provided to control humidity in the product fabrication module 142. The desiccant canister 153 may be equipped with its own forced air flow fan or a passive system may be employed. A forced air system for the desiccant canister 153 may be controlled by the electronics module 150 or with a simple self-contained timing mechanism. As shown in FIG. 2, the fabrication module 142 includes a washable liner 154 that covers the upper portion of the compartment 142. At the end of the business day, certain components of the product fabrication module 142 must be removed for cleaning and sanitizing and the liner 154 must also be cleaned or sanitized for compliance with most local health and sanitation laws. In that regard, the cup-lifter mechanism 155, whose operation will be explained in greater detail below, is removable along with various components of the product fabrication module 142. Operation of the hold-down mechanism 157, hold-down plate 158 and removal of the cup-lifter mechanism 155 will be explained in greater detail below in connection with FIGS. 27-28 and 46-49.

Figure 7:
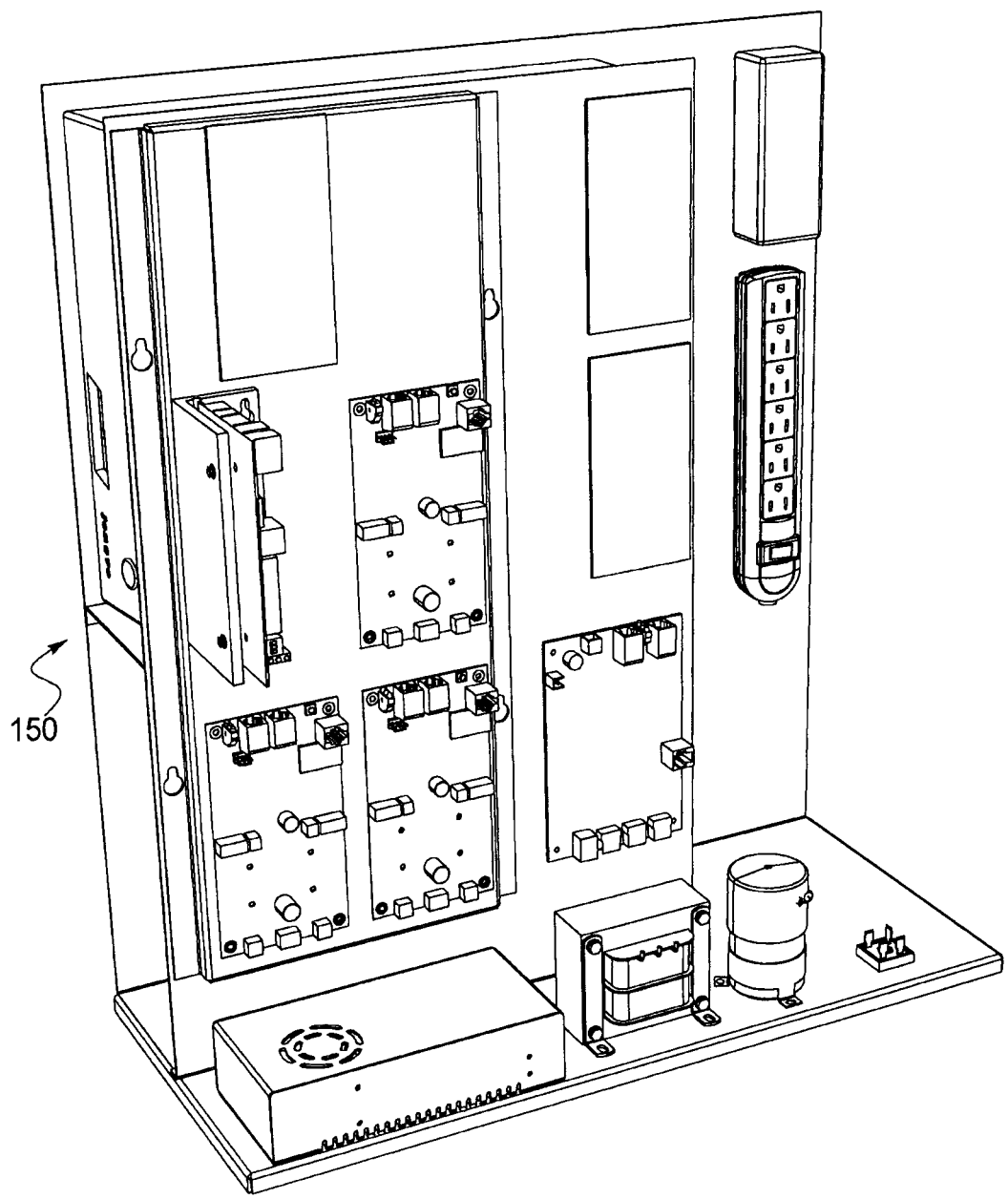
FIG. 7 is a perspective view of the electronic control module for the dispensing machine illustrated in FIGS. 1-3.

The compressor 146, evaporator 146a and refrigeration module 147a are illustrated in FIGS. 4-5 and the placement of the module 147a above the flavor module 147 is illustrated schematically in FIGS. 2-3. FIG. 6 illustrates a lower compartment or base module 138 with two base containers 139 and associated pumps 140. More than two base containers 139 may be provided. However, the two base containers 139 illustrated are convenient if one is used for premium or higher fat-content base and the other is used for "light" base such as lower fat, lower calorie and/or reduced sugar base. Again, the electronics module 150 is illustrated in FIG. 7 as well as FIGS. 2-3.

Figure 8:
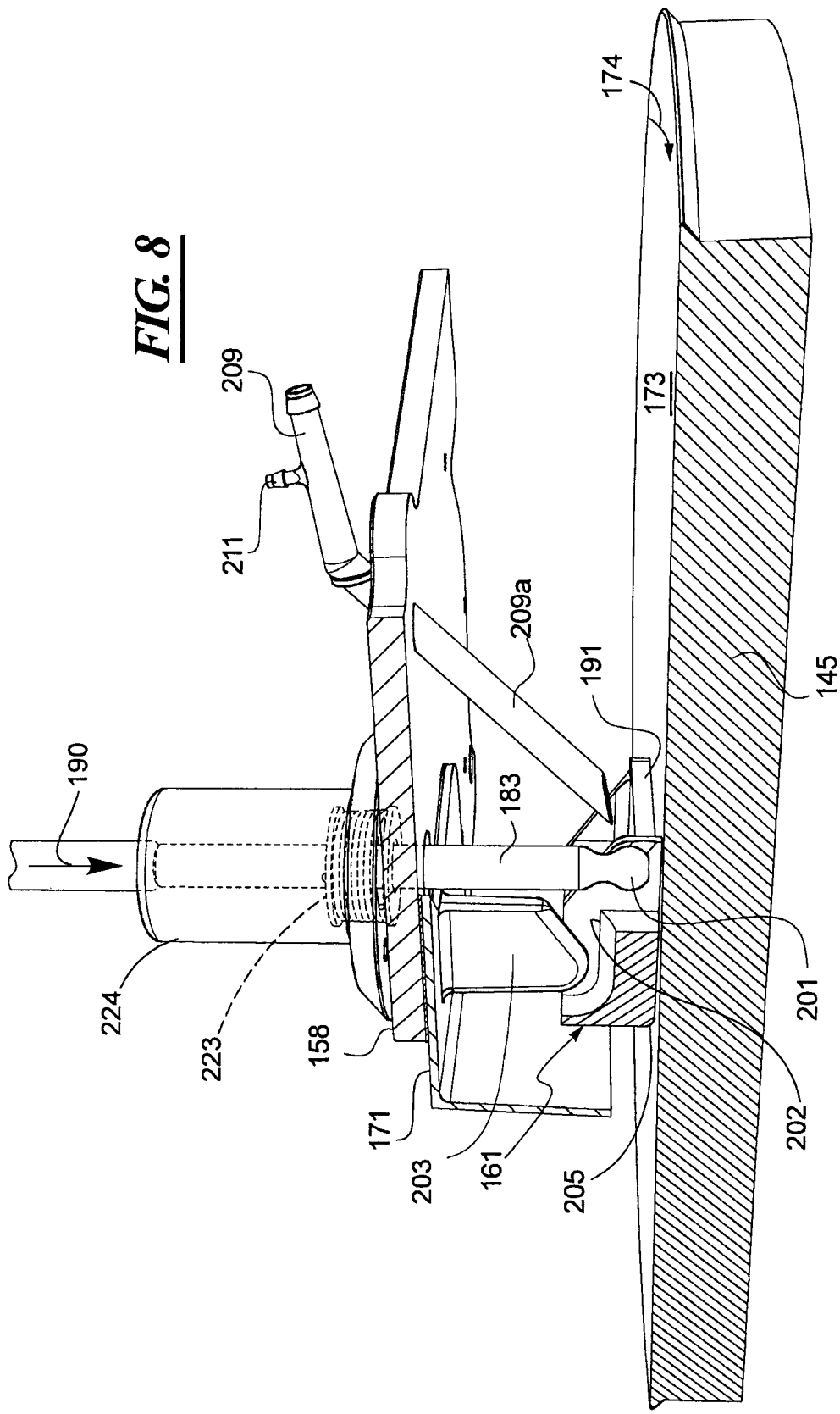
FIG. 8 is a sectional perspective view of a disclosed rotating freeze plate, spreader body, aerated mix delivery conduit, hold-down plate and the lift mechanism for moving the spreader body between spreading and cleaning positions.
Figure 27:
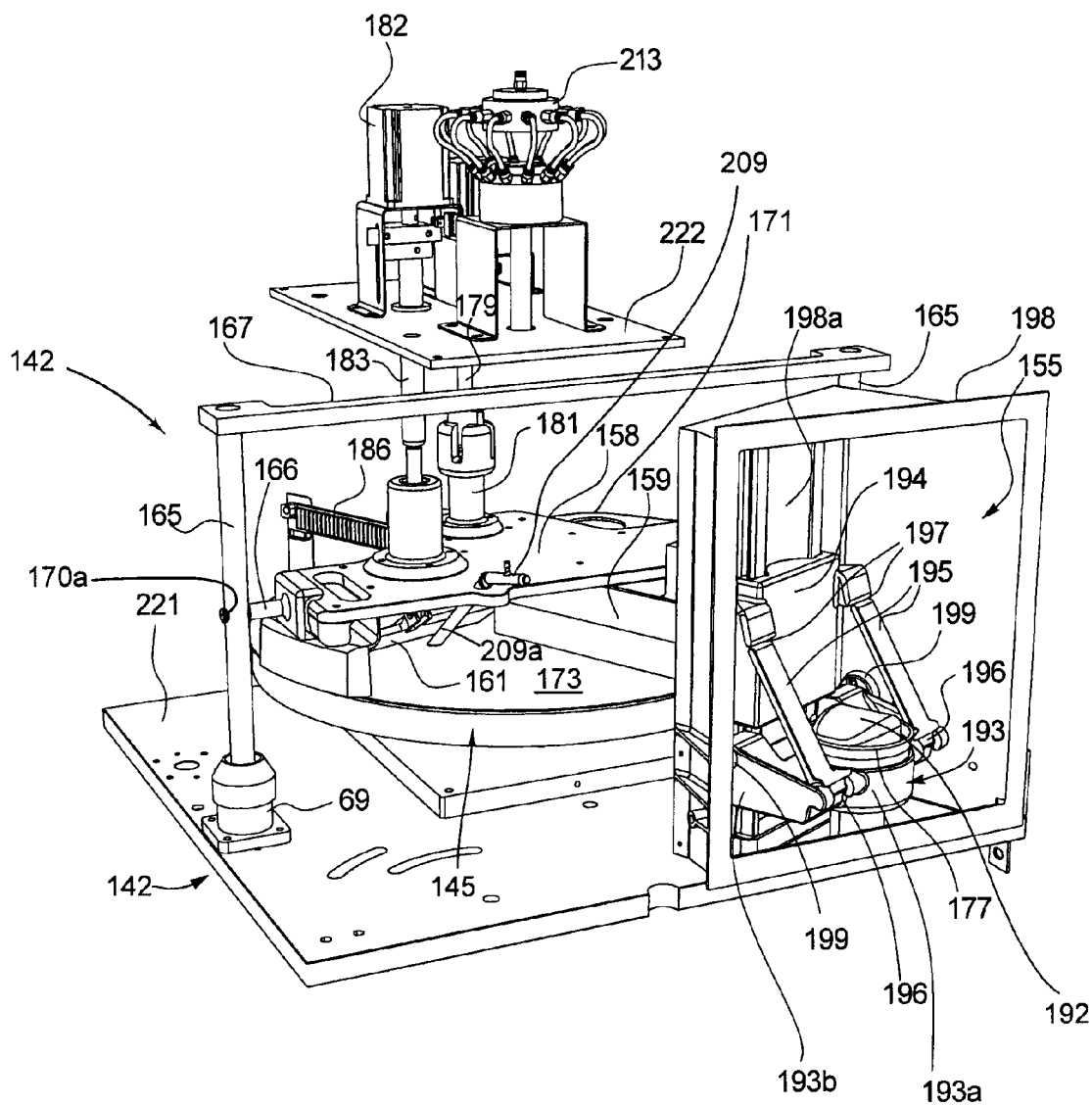
FIGS. 27-29 are partial perspective and sectional views illustrating, amongst other things, the hold-down plate, the connections between the hold-down plate and the posts or risers of the hold-down mechanism illustrated in greater detail in FIGS. 46-49 below, the motor and ratchet mechanism for moving the plow, and the relationship between the plow, scraper body and one of the disclosed cup-holder mechanisms.
Figure 28:
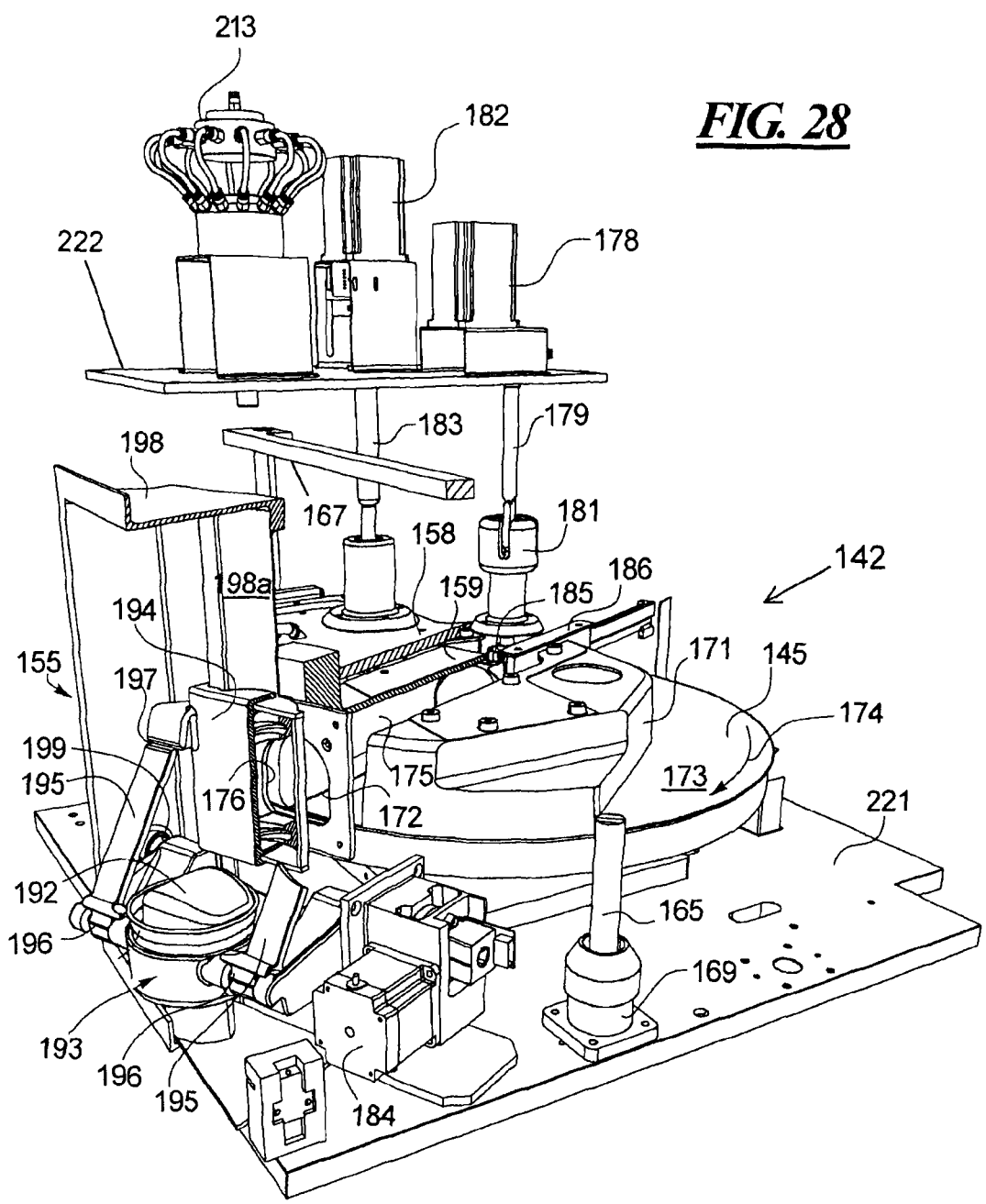

Turning to FIG. 8, the spreader body 161 is pivoted downward into the cleaning position on top of the freeze plate 145 by downward movement of the spreader shaft 183 under the power of the spreader motor 182 (see FIGS. 27-28). Preferably, the spreader shaft 183 is coupled to the spreader body 161 by a ball and socket connection as indicated by 201 in FIGS. 8 and 201a in FIGS. 15-16. When spreader body 161 is pivoted upward to a spreading position as illustrated in FIGS. 10-14, the recess 202 in the spreader body 161 will engage an abutment 203 disposed on the underside of the hood 171 or hold-down plate 158. In the cleaning position illustrated in FIG. 8, both the spreader edge 205 and forward cleaning edge 191 of the spreader body 161 rest against the upper surface 173 of the freeze plate 145.

Figure 15:
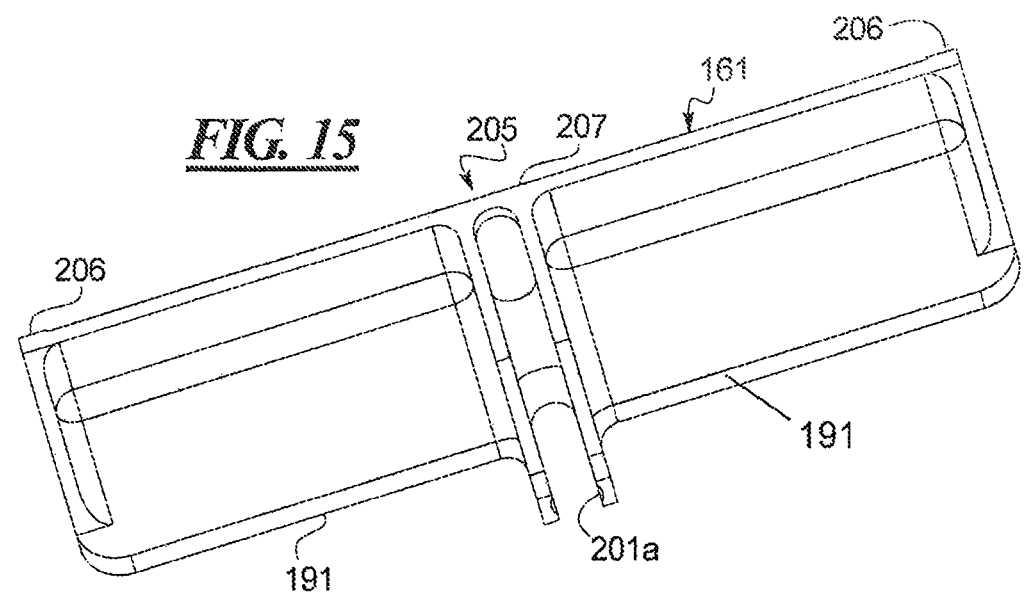
FIG. 15 is a top plan view of one disclosed spreader body.
Figure 16:
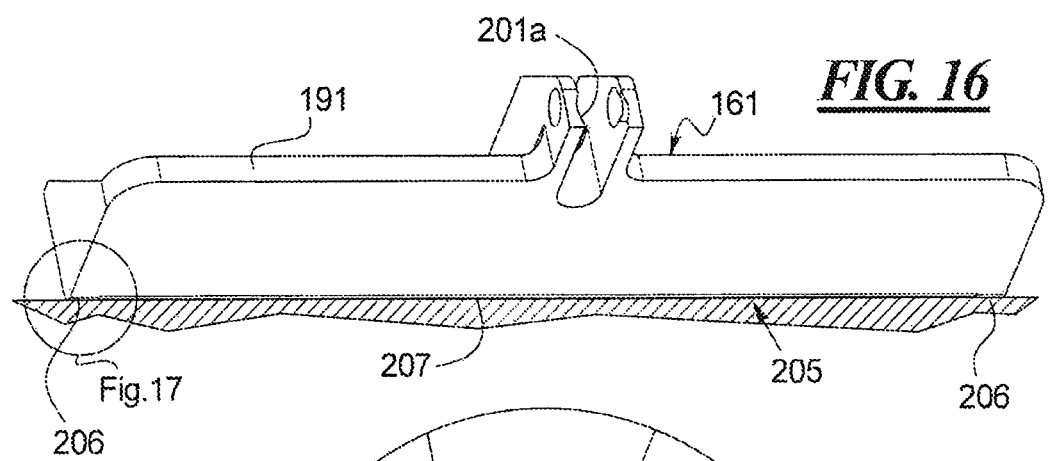
FIG. 16 is a rear perspective view of the spreader body of FIG. 15 as shown engaging a freeze plate and with the spreader body in the spreading position.
Figure 17:
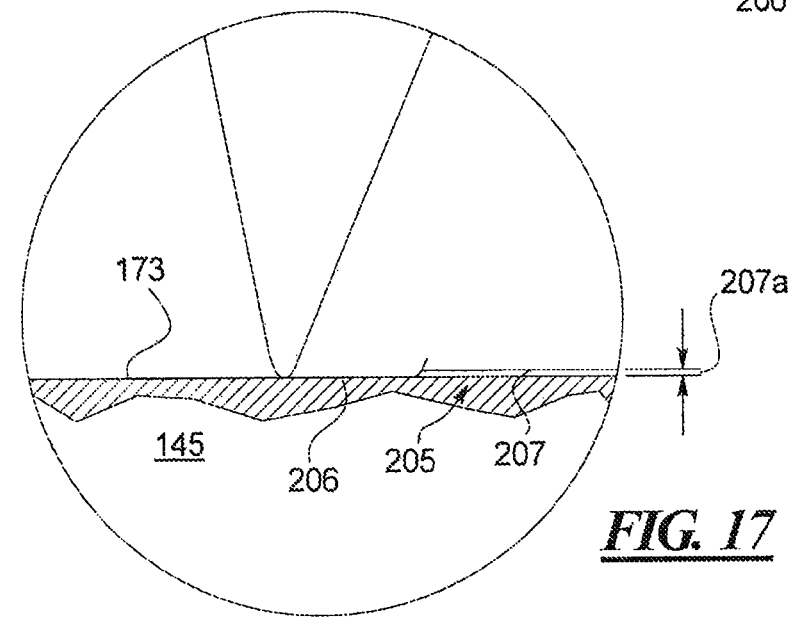
FIG. 17 is an enlarged partial view of the spreader body of FIGS. 15-16 illustrating one of the rounded end supports and a portion of the spreader blade and how the rounded end supports are used to space the spreader blade above the upper surface of the rotating freeze plate by a fixed distance or gap thereby ensuring even distribution of the chilled aerated mix on the freeze plate.

The spreader edge 205 is shown in greater detail in FIGS. 15-17. As seen in FIGS. 15-16, the spreader edge 205 includes a rounded end supports 206 disposed on either end of a spreader blade 207. As shown in FIG. 17, the rounded end supports 206 support the spreader blade 207 above the upper surface 173 of the freeze plate 145 by a gap or distance shown at 207a in FIG. 17 to ensure consistent, even spreading of the aerated mix over the upper surface 173 of the freeze plate 145. The spreader blade 207 and end supports 206 also define an area of the upper surface 173 over which the aerated mix is spread.

Figure 21:
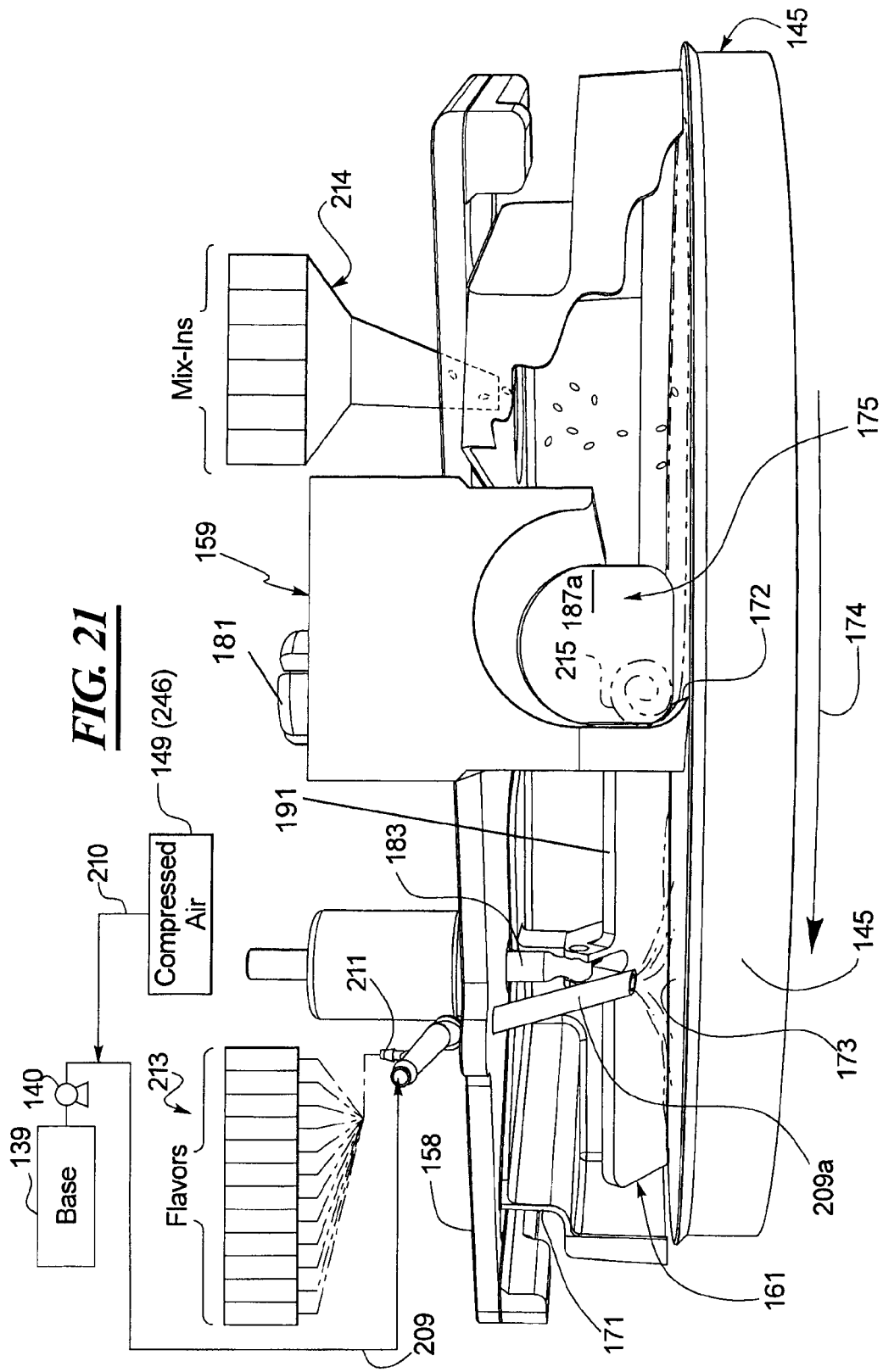
FIG. 21 is a side plan view of the freeze plate, scraper, spreader, hold-down plate along with the schematic illustrations of the base, flavor, air and mix-in supplies.

Alternative the spreader bodies 161a, 161b are illustrated in FIGS. 18-20. In FIG. 18 the spreader blade 207b includes three supports including two end supports 206a and a middle support 206b. It has been found through testing that maintenance of a consistent gap 207a between the upper surface 173 of the freeze plate 145 (FIG. 17) is important for obtaining a high quality product. That is, once the rotational speed of the freeze plate 145 is determined, which is dependent upon the height of the gap 207a, maintenance of the gap 207a ensures that the desired amount of product is placed on the rotating freeze plate and as time to adequately freeze before being scraped off of the freeze plate 145 by the scraper body 159 (FIG. 21). Otherwise, if the gap 207a is not adequately maintained or the thickness of the layer deposited on the upper surface 173 of the rotating freeze plate 145 is not maintained, the rotational speed of the freeze plate 145 may need to be adjusted. Because force is applied to the spreader body 161, any downward bowing of the spreader blade 207, 207b will affect the height of the gap 207a. In one embodiment, the gap 207a is maintained at about 12 mil (304.8 nm). The employment of a center foot 206b (FIG. 18) is provided to help maintain a consistent gap 207a, e.g. 12 mil (304.8 nm).

Another problem associated with the spreader bodies 161, 161a is addressed in the embodiment 161b illustrated in FIGS. 18-20. Specifically, build up of waste material tends to occur on the rear wall 212 of the spreader bodies 161, 161a, 161b during the cleaning cycle when the forward cleaning edge 191 of the spreader bodies 161, 161a are pressed downward to the upper surface 173 of the rotating freeze plate 145. Through testing, it has been found that the inclusion of a recess 204 in the rear wall 212 close to the spreader blade 207c helps to alleviate this problem.

Figure 9:
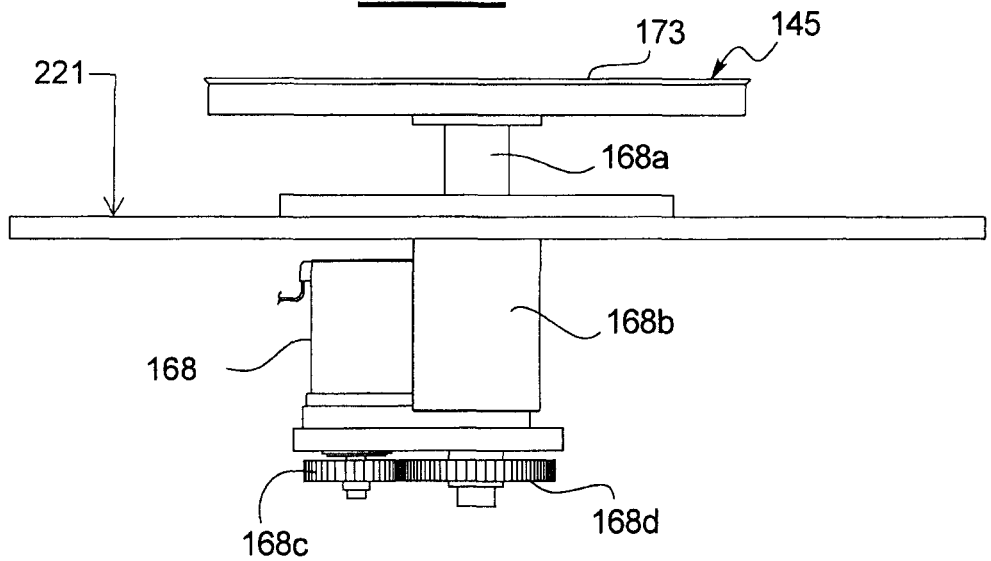
FIG. 9 is a side plan view of the rotating freeze plate, stepper motor for rotating the freeze plate, gearbox and associated coupling assembly for coupling the stepper motor to the freeze plate.
Figure 10:
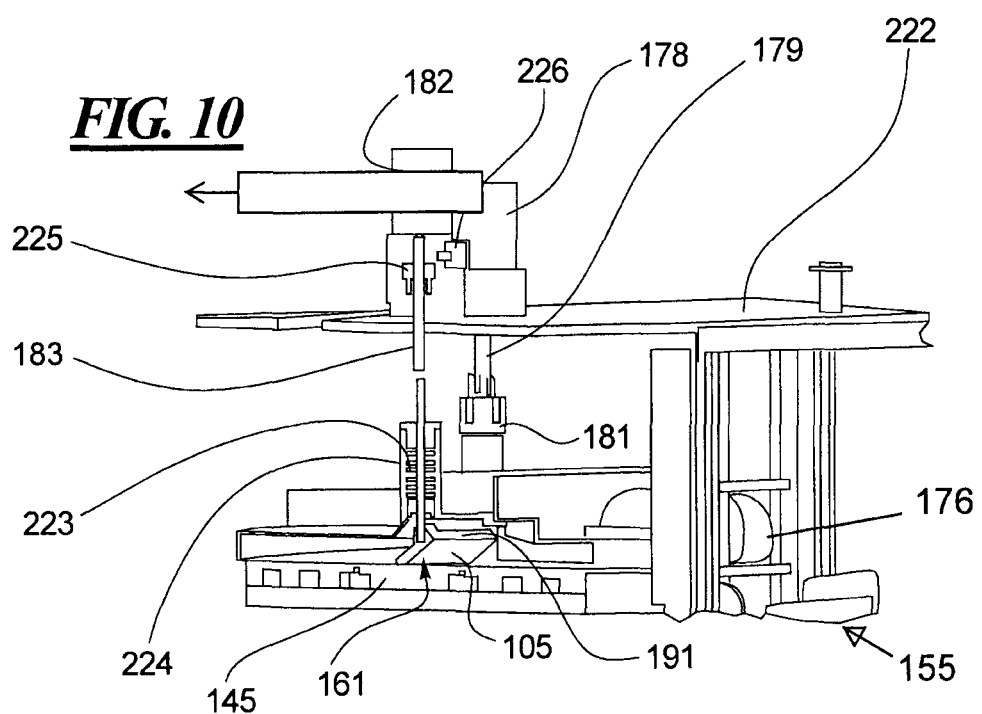
FIG. 10 is a side perspective view illustrating how the spreader shaft is retracted to an upward or spreading position thereby causing the forward cleaning edge of the spreader body to pivot upward away from the freeze plate.

FIGS. 9-10 further illustrate various mechanisms for moving the freeze plate 145, spreader body 161 and plow 187. Turning to FIG. 9, the freeze plate 145 is coupled to a stepper motor 168 by a coupling assembly 168a, 168b and spur gears 168c, 168d. A pair of pulleys may also be employed instead of the spur gears 168c, 168d. The coupling assembly 168a, 168b, stepper motor 168 and freeze plate 145 may all be supported by a common platform 221. In FIG. 10, both the stepper motor 182 that is used for raising and lowering the forward cleaning edge 191 of the spreader body 161 and the stepper motor 178 that is used for moving the plow 187 (not shown in FIG. 10; see FIGS. 25-29) are supported on the upper platform 222. The spreader body 161 is shown in the retracted or spreading position in FIG. 10 as the motor 182 has raised the shaft 183 upward with the bias of the spring 223 thereby lifting the forward cleaning end 191 of the spreader body 161 away from upper surface 173 of the freeze plate 145 while leaving the spreader edge 205 in the abutting relationship with the upper surface 173 of the freeze plate 145 as shown in FIGS. 10-14. The spring 223 for biasing the spreader shaft 183 downward may be accommodated in a standard housing 224. The shaft 183 may be equipped with a flag 225 which can be sensed by an optical or magnetic sensor 226 when the shaft 183 and spreader body 161 are in the upward or spreading position illustrated in FIGS. 10-14. FIG. 10 also illustrates the stepper motor 178 used to move the plow when 87. The stepper motor 178 is coupled to a shaft 179 that is received by a coupling 181 which comprises a gear 185 that is enmeshed with a track 186 for moving the plow 187 forward and backward as better illustrated in FIG. 29.

Figure 11:
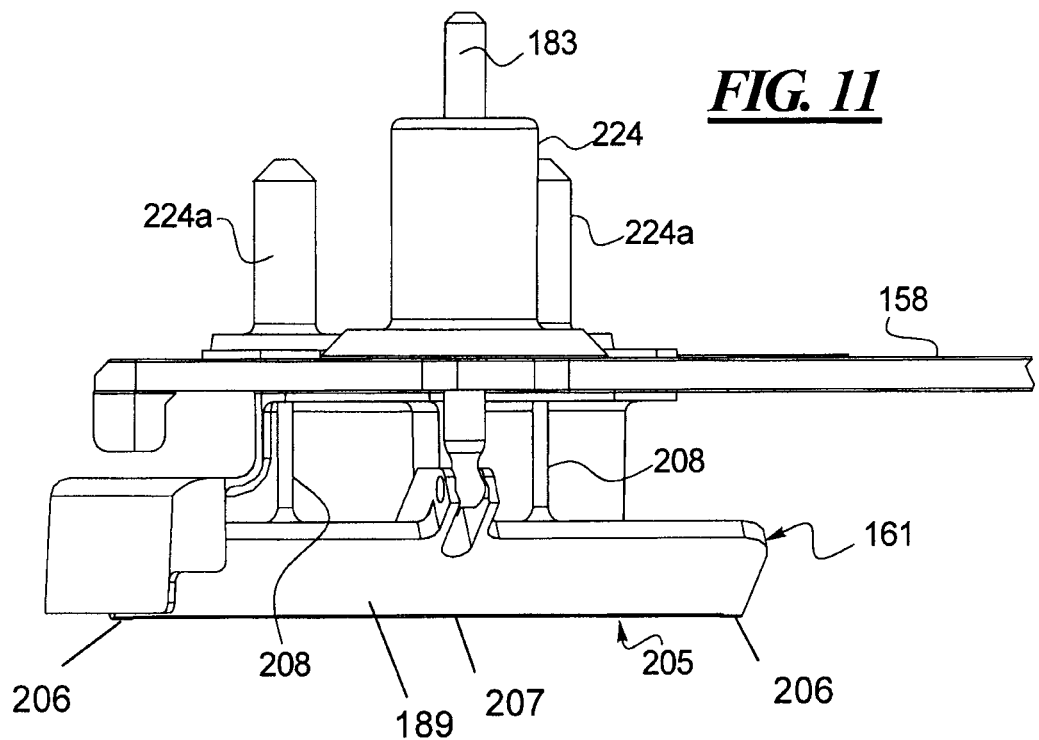
FIG. 11 is a side view illustrating an alternative arrangement for the spreader assembly which includes a pair of springs for biasing the rear spreading end of the spreader body against the freeze plate.
Figure 12:
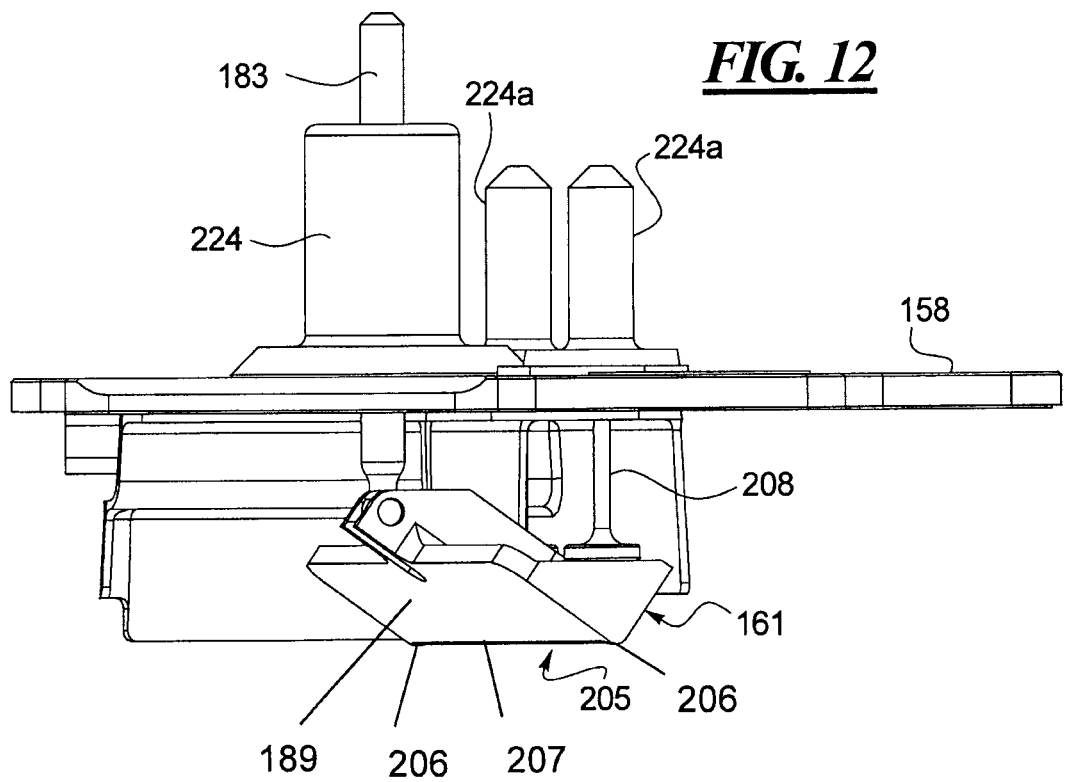
FIG. 12 is another side view of the spreader assembly shown in FIG. 11.

Turning to FIGS. 11-12, one alternative arrangement for biasing the spreader edge 205 of the spreader body 161 onto the freeze plate 145 (not shown in FIGS. 11-12) is illustrated. Instead of the abutment 203/recess 202 combination illustrated in FIG. 8, the spreader body 161 is biased downward by a pair of spring-biased feet 208 each of which include a spring (not shown) disposed within one of the housings shown at 224a in FIG. 11. The pair of spring-biased feet 208 apply uniform downward pressure on the spreader body 161 to help maintain a consistent gap 207a between the spreader body 161 or spreader blade 205 and the rotating freeze plate 145 (see FIG. 17). Another means for applying downward pressure on the spreader body 161 is illustrated in FIG. 13 in the form of a flexible biasing member 208a which may be coupled to the hold-down plate 158 and which may be constructed from a relatively rigid but flexible material, such as rubber. Other materials will be known to those skilled in the art. Still another means for biasing the spreader edge 205 of the spreader body 161 towards the freeze plate 145 is illustrated and FIG. 14. Each end of the spreader body accommodates a magnet 208b and the hold-down plate 158 is similarly equipped with a pair of magnets 208c of opposite polarity to the magnets 208b. The use of magnets 208b, 208c of opposing polarities may be beneficial because it includes no moving parts or parts prone to wear.

Turning to FIG. 21, the fabrication of a serving 192 (FIGS. 27-28) will be described. Chilled base from a base container 139 is delivered to a conduit 209 by a pump 140 (see also FIGS. 2 and 6) where it is aerated with a flow of air delivered through an air inlet 210 and provided by the compressor 246 of the module 149 (FIG. 2-3). The aerated chilled base continues to flow through the conduit 209 and is combined with one or more flavors delivered to a flavor inlet 211 by flavor pumps (not shown) and a manifold 213 (see also FIGS. 2-3) to create a "mix" passing through the inlet conduit 209a before it is deposited onto the upper surface 173 of the rotating freeze plate 145 as shown in FIG. 21. The flavor pumps may be a plurality of peristaltic pumps, each with its own stepper motor. The slots 215, 215a shown in FIG. 2 can be used to accommodate flavor containers, peristaltic pumps and stepper motors for running the flavor pumps.

As the freeze plate 145 rotates in the direction of the arrow 174, the mix deposited on the upper surface 173 and passes underneath the spreader 161 to provide a smooth even layer on the surface 173 of the freeze plate 145 where the aerated mix freezes. As the plate 145 continues to rotate, the frozen aerated mix rotates towards the scraper 159 and, more specifically, the scraper blade 172. Prior to being engaged or scraped by the scraper blade 172, additional solid material ("mix-ins") may be deposited through a hopper system 214 and onto the frozen layer of aerated mix illustrated towards the right in FIG. 21. As the freeze plate 145 continues to rotate, frozen aerated mix is scraped off of the upper surface 173 by the blade 172 to form a growing cylindrical mass 215 or "pre-scoop" inside the channel 175. After the freeze plate 145 has made a complete rotation, the base pump 140 and flavor pump/module 213 are turned off and the shaft 183 is lowered to place the leading cleaning edge 191 of the spreader body 161 into the cleaning position as described above. The accumulated mass 215 in the channel 175 is ready to be pressed into a scoop or portion 192 and deposited in a serving container 177 as shown, for example, in FIGS. 27-29.

As illustrated in FIG. 22, the scraper blade 172a may be fabricated from resilient material in the form of a replaceable member 227 attached to the scraper body 159a using an attachment mechanism such as an elongated bead 238 disposed along a rear side 239 of the scraper body 159a and the corresponding slot 240 disposed opposite the member 227 from the blade 172a. Using a resilient material for the scraper blade 172a has been found to leave less residue on the freeze plate 145 which avoids problems associated with carryover of product of one serving (e.g., pistachio-green) bleeding into or leaving traces on a subsequent serving of product of another color (e.g. vanilla-yellow or white/yellow). Further, the wearable and replaceable material scraper body 227 may be fabricated using conventional material, such as polyurethane. The blade 172a should maintain intimate contact with the freeze plate 145 to facilitate the subsequent cleaning that is carried out via the forward cleaning edge 191 of the spreader body 161. Keeping the upper surface 173 freeze plate 145 clean avoids contamination issue discussed above, particularly when a product of a light color, such as vanilla, is dispensed immediately subsequent to a product of a darker or brighter color, such as strawberry, pistachio, etc. Employing a replaceable blade member 227 helps to ensure that substantially all of the product of one dispense is scraped off of the upper surface 173 of the freeze plate 145 prior to being dispatched to a serving cup by the plow 175 as discussed below in before subsequent product mix is deposited on the upper surface 173 of the rotating freeze plate 145.

Figure 24:
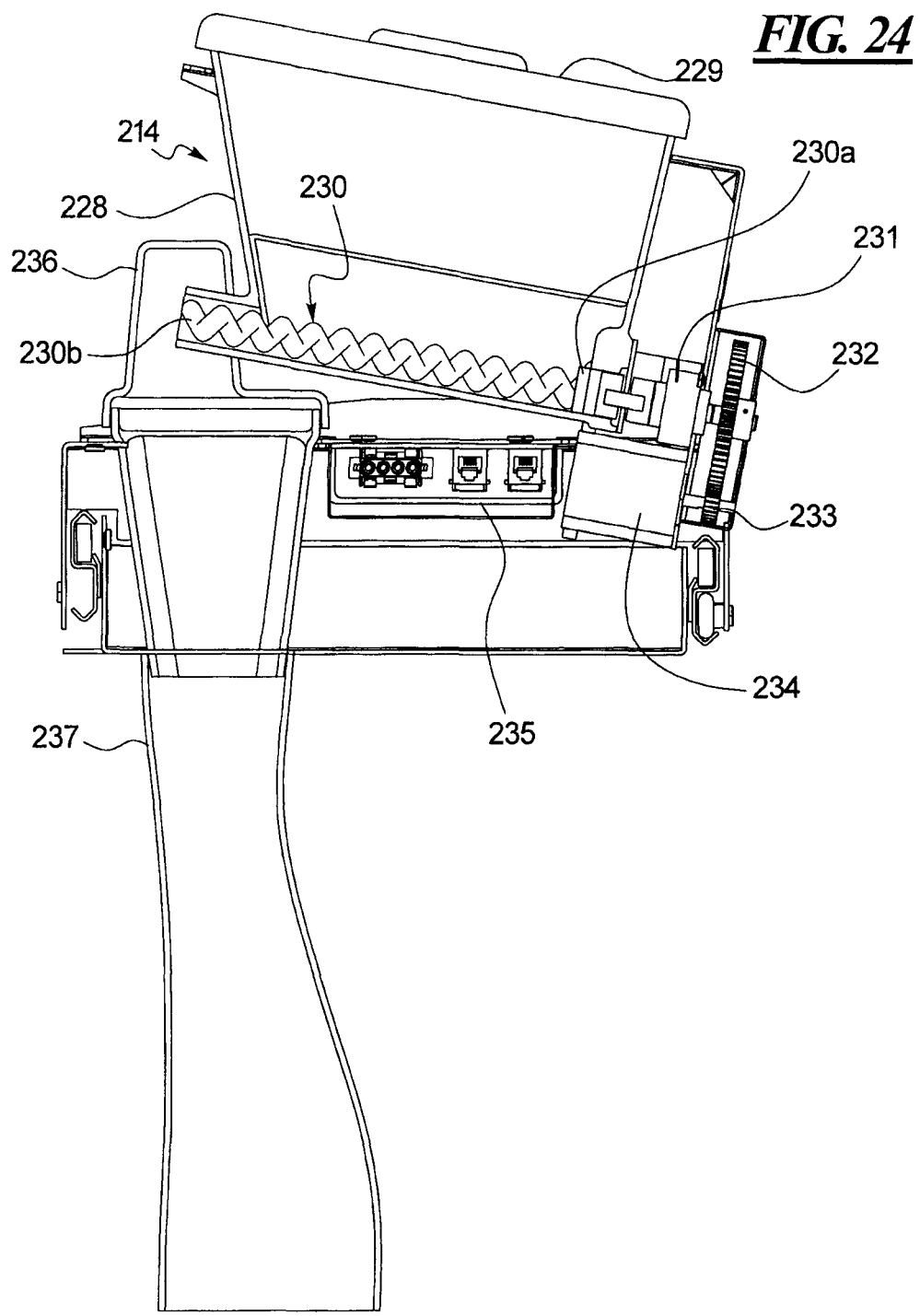
FIG. 24 is a side plan view of a mix-in dispenser assembly, particularly illustrating a bin, auger, stepper motor, funnel and chute, used to sprinkle solid mix-in materials on top of the mix disposed on the rotating freeze plate and after the mix has been spread to the appropriate thickness by the spreader body as illustrated in FIG. 21.

Additional details of the hopper system 214 are provided in FIG. 24. The hopper system 214 preferably includes a bin 228 that is equipped with a cover 229. The bin 228 accommodates an auger 230. The proximal end 230a of the auger 230 is coupled to a coupling 231 that, in turn, is coupled to a spur gear 232. The spur gear 232 is enmeshed with a spur gear 233 that is coupled to the auger stepper motor 234. The controller 235 relays the communications from the control module 150 (FIGS. 2-3 and 7). The distal end 230b of the auger 230 extends into a funnel 236. The funnel 236 is disposed above and is coupled to a chute 237, through which the particulate mix-in materials pass before being deposited onto the aerated base layer that has been deposited onto the upper surface 173 of the rotating freeze plate 145.

Figure 25:
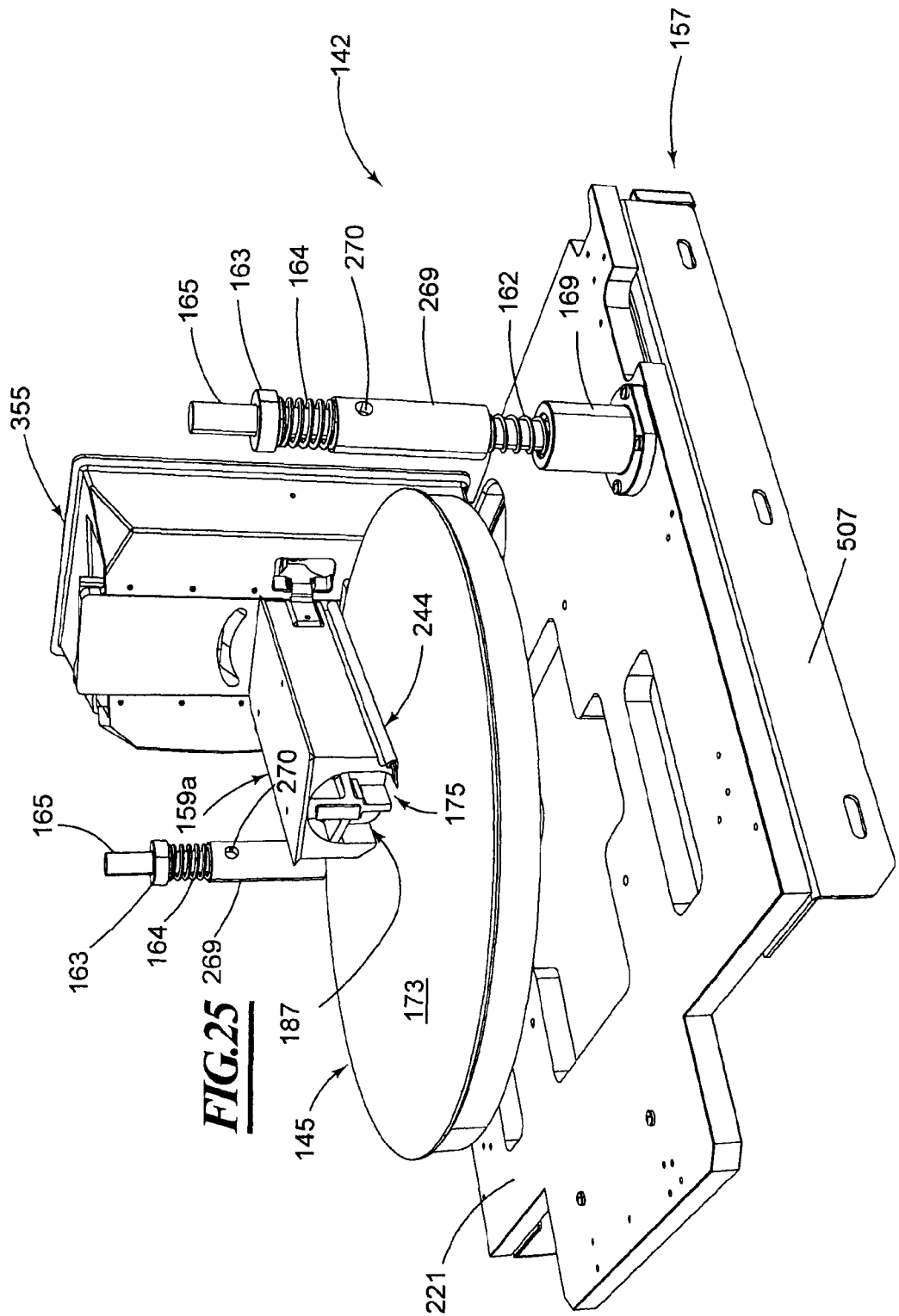
FIGS. 25-26 are partial rear perspective views of a disclosed product fabrication module illustrating the plow disposed within the scraper body and the connection between the scraper body and the cup-lifter mechanism and the position of the rotating freeze plate behind the cup-lifter mechanism.
Figure 26:
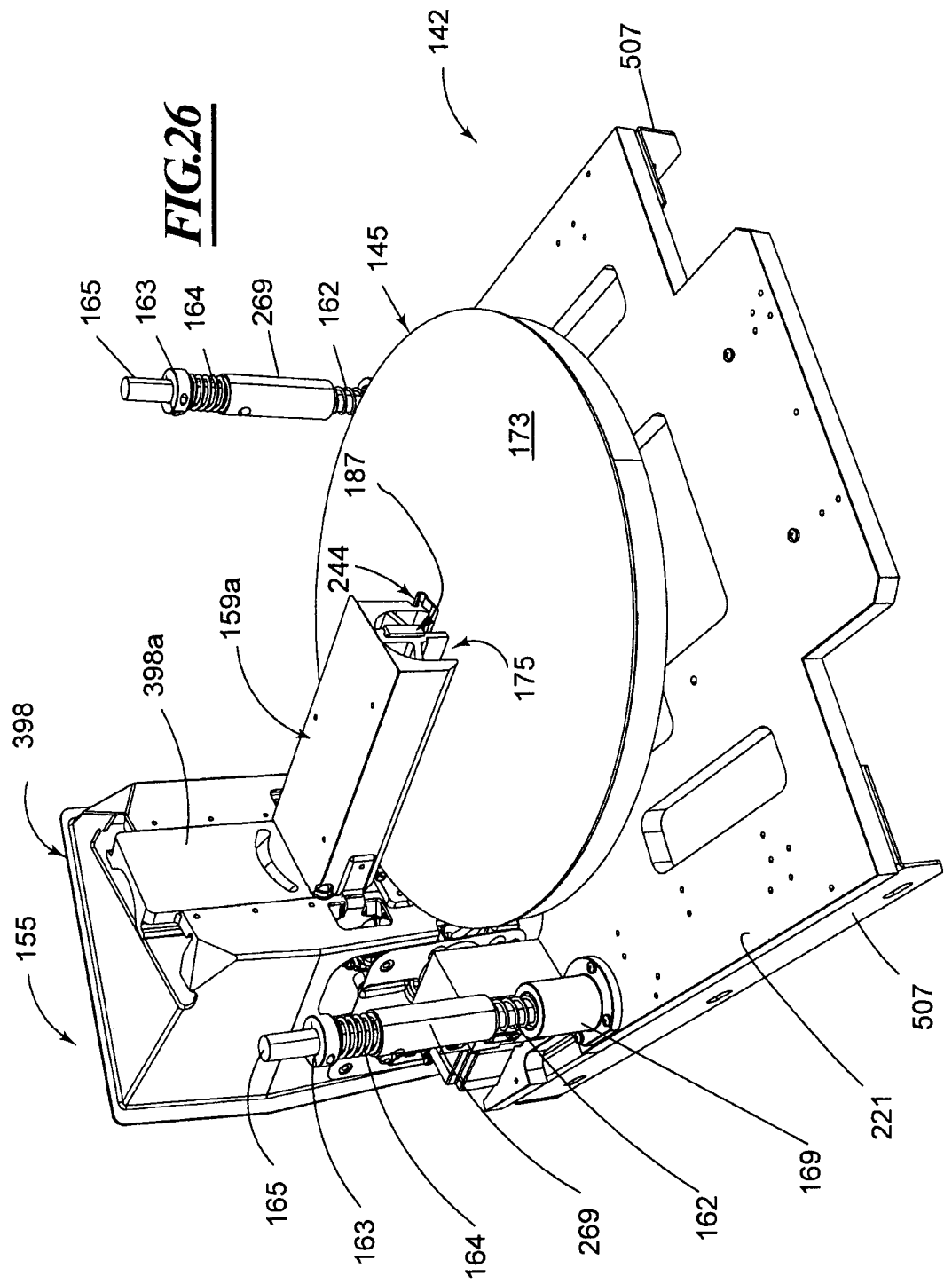

FIGS. 25-26 provide rear views of one disclosed cup-lifter mechanism 355, scraper body 159a and plow 187 which passes through the channel 175 in the scraper body 159a. The freeze plate 145 and scraper body 159a are disposed between a pair of posts 165 that are biased upward by action of the springs 164 against the collars 163 and by the action of the springs 162 against the linear bearings 169 and bushings 269. The bushings 269 include through openings 270 for accommodating the clamps 166 illustrated in FIG. 27. The product fabrication module 142 (see also FIGS. 2-3) is supported above the platform 221. The operation of the clampdown mechanism 157 will be explained in greater detail in connection with FIGS. 27 and 46-49. The cup-lifter mechanism 355 is illustrated in greater detail in FIGS. 32-37.

Figure 29:
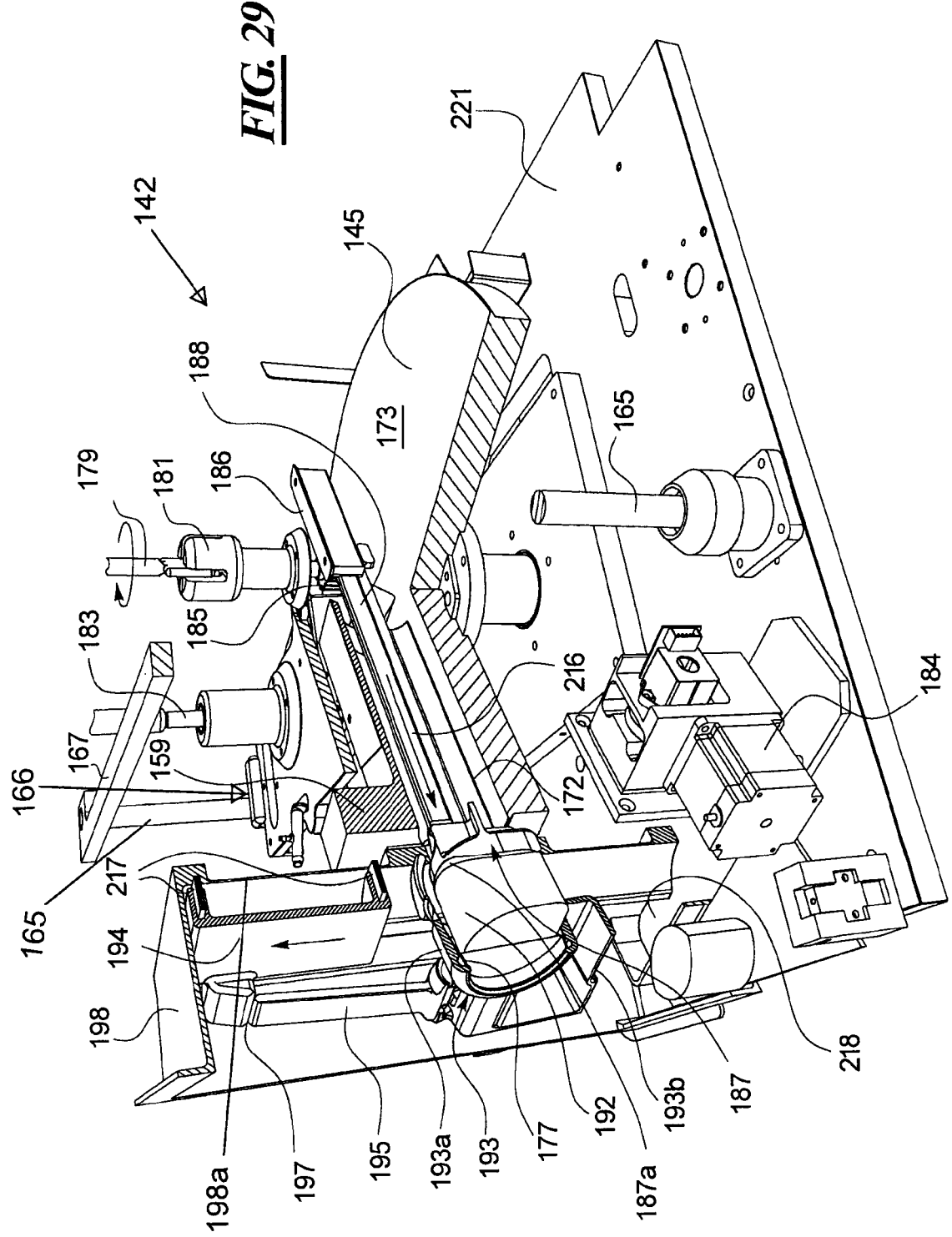

Turning to FIGS. 27-29, the freeze plate 145 is partially covered by the hold-down plate 158 and hood 171. The hold-down plate 158 also presses the scraper body 159 downward so that the leading edge or scraper blade 172 engages the upper surface 173 of the freeze plate 145 in a direction opposite the direction of rotation of the freeze plate 145, which is indicated by the arrow 174 in FIG. 28. FIG. 28 also partially illustrates the channel 175 formed by the scraper body 159 in which scraped, frozen and aerated mix accumulates as the freeze plate 145 rotates. The accumulated scraped frozen aerated mix is collected in the channel 175 and pushed down the channel and through the access opening 176 by the plow 187 to an awaiting cup 177 that is supported by the cup-lifter mechanism 155 (FIG. 27-29) or 355 (FIGS. 25-26 and 32-37). The plow motor 178 rotates the shaft 179 and plow coupling 181. The plow coupling 181 is coupled to the gear 185 (FIG. 29) which is enmeshed with a track 186 (FIG. 27) that is coupled to the plow 187 by the shaft or rod 188 (FIG. 29). Thus, rotational movement of the plow gear 185 is translated into lateral movement of the plow track 186, plow connecting rod 188 and plow 187 as indicated by the arrow 216 (FIG. 29). The spreader motor 182 (FIGS. 27-28) raises and lowers the shaft 183 for placing the spreader body 161 in the spreading position shown in FIGS. 10-14 or in the cleaning position shown in FIG. 8. Downward movement of the shaft 183 (see the arrow 190 of FIG. 8) against the bias of the spring 223 urges of the bottom surface 189 of the spreader body 161 against the upper surface 173 of the freeze plate 145 in a cleaning position. In the position shown in FIG. 8, the forward edge 191 faces the against direction of rotation 174 of the freeze plate 145 in the cleaning position and acts to scrape residue off of the upper surface 173 of the freeze plate 145 to avoid mixing the contents of a previous serving with the serving currently being prepared.

Returning to FIGS. 27-29, the crossbeam 167 couples the vertical posts 165 to provide structural integrity. The upper platform 222 supports the flavor manifold 213, spreader body motor 182 and plow motor 178. The clamps 166 connect the vertical posts 165 to the hold-down plate 158. The hold-down plate 158 is drawn downward to the fabrication position illustrated in FIGS. 27-29 by the clampdown mechanism 157 illustrated in greater detail in connection with FIGS. 46-49.

The scoop or serving 192 is formed by the action of the plow 187 passing through the channel 175 of the scraper body 159. The scoop or portion 192 is received in a cup 177 at the cup-lifter mechanism 155. In one embodiment, the cup-lifter mechanism 155 includes a motor 184 (FIG. 29) which drives the cup-lifter mechanism 155. In the position shown in FIGS. 27-28, the cup-lifter mechanism 155 is in the dispense or starting position illustrating the position of a realistic looking scoop or serving 192 disposed in a cup 177 received in the cup-holder 193. The cup-holder 193 is pivotally coupled to an elevator door 194 so the cup-holder 193 can pivot upward and rearward towards the access opening 176 as shown in FIG. 28. More specifically, as shown in FIG. 29, the cup-holder 193 includes a front end 193a that is pivotally coupled to a pair of spaced apart arms 195 at the pivotal connections shown generally at 196 which couple the proximal ends of the arms 195 to the cup-holder 193 using a pivot pin connection. The distal ends of the arms 195 are coupled to the door 194 with a living hinge mechanism or other flexible mechanism shown generally at 197. The rear end 193b of the cup-holder 193 (FIG. 29) is pivotally coupled to the rear wall 198a of the frame 198 of the cup-lifter mechanism 155 at the pivot shafts 199, one of which may be driven by the cup-lifter motor 184. To move the cup 177 and cup-holder 193 of the mechanism 155 illustrated in FIG. 27-29 into a receiving position in front of the access opening 176 as shown in FIG. 29, the motor 184 rotates the shaft 199 which raises the door 194 upwards towards the top of the frame 198 and causes the cup-holder 193 and cup 177 contained therein to pivot towards the access opening 176 and into position in alignment with the channel 175 for receiving the scraped frozen aerated mix that will be pushed into the cup 177 by the plow 187 as illustrated in FIG. 29.

After the mix has been deposited onto the upper surface 173 of the rotating freeze plate 145 and the plate 145 is rotated in the direction of the arrow 174 towards the scraper body 159, and scraped, frozen mix has accumulated in the channel 175, the plow motor 178 (FIG. 28) is activated thereby rotating the shaft 179 and the plow coupling 181 which causes the gear 185 (FIGS. 28-29) to rotate and move the rack 186 forward or in the direction of the arrow 216 to the fully extended position shown in FIG. 29. The face 187a of the plow 187 pushes the mass 192 into the cup 177.

Figure 30:
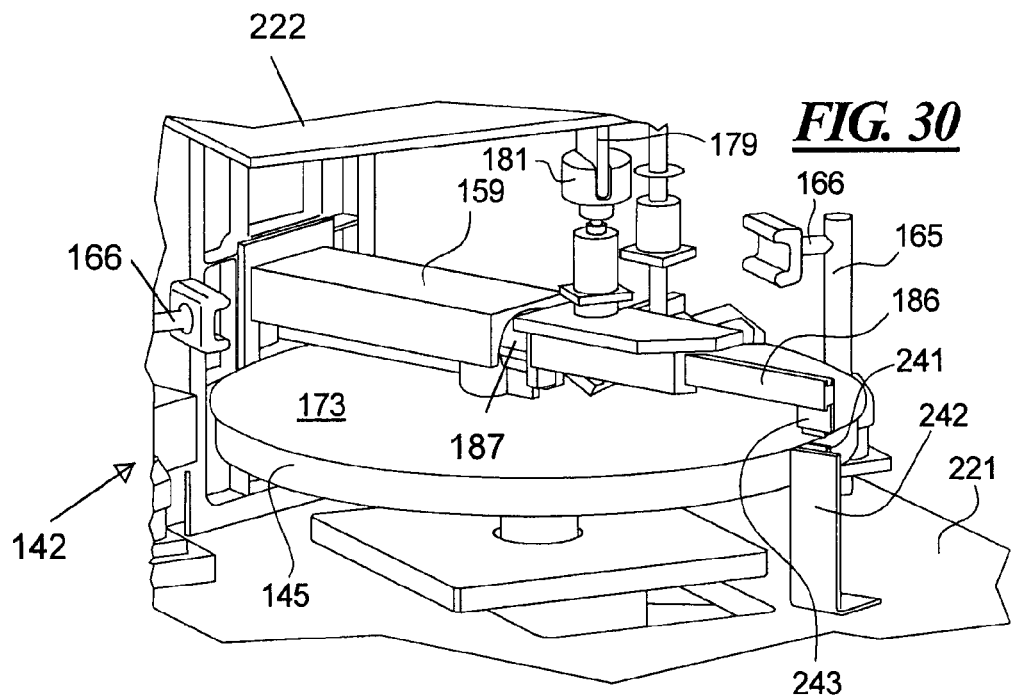
FIG. 30 is a partial perspective view illustrating the plow in a fully retracted position is indicated by the position of the magnet over the magnet sensor located radially outward from the outer periphery of the rotating freeze plate.
Figure 31:
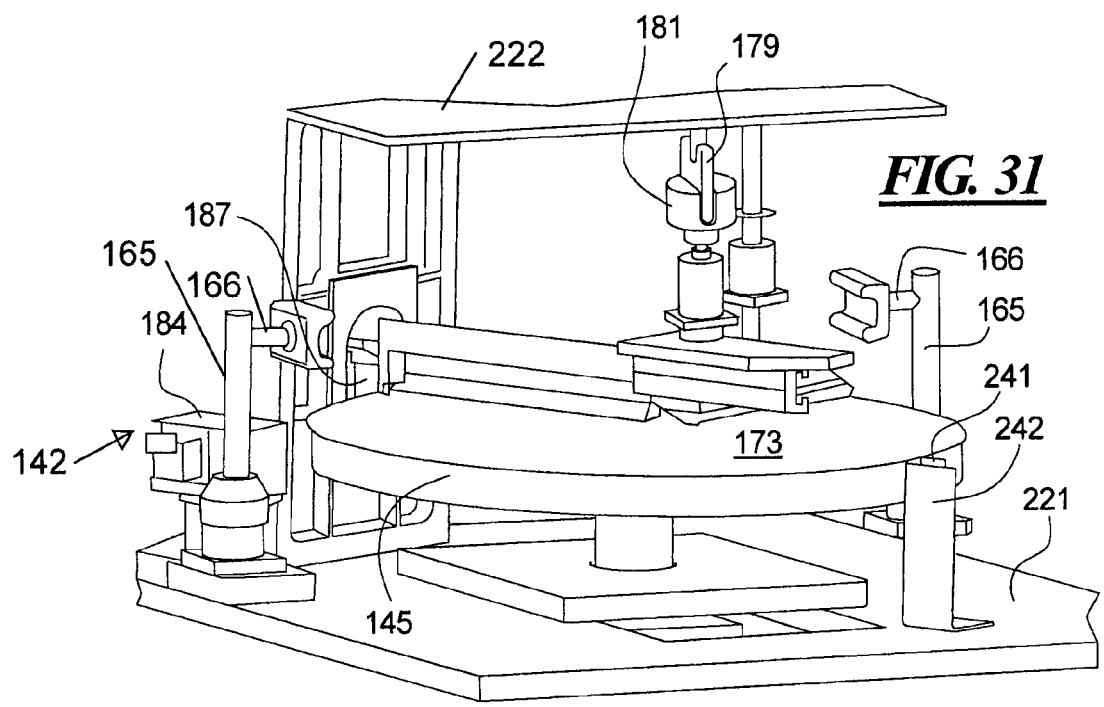
FIG. 31 is another partial perspective view illustrating the plow in a fully extended or cleaning position with no magnet disposed over the sensor.
Figure 32:
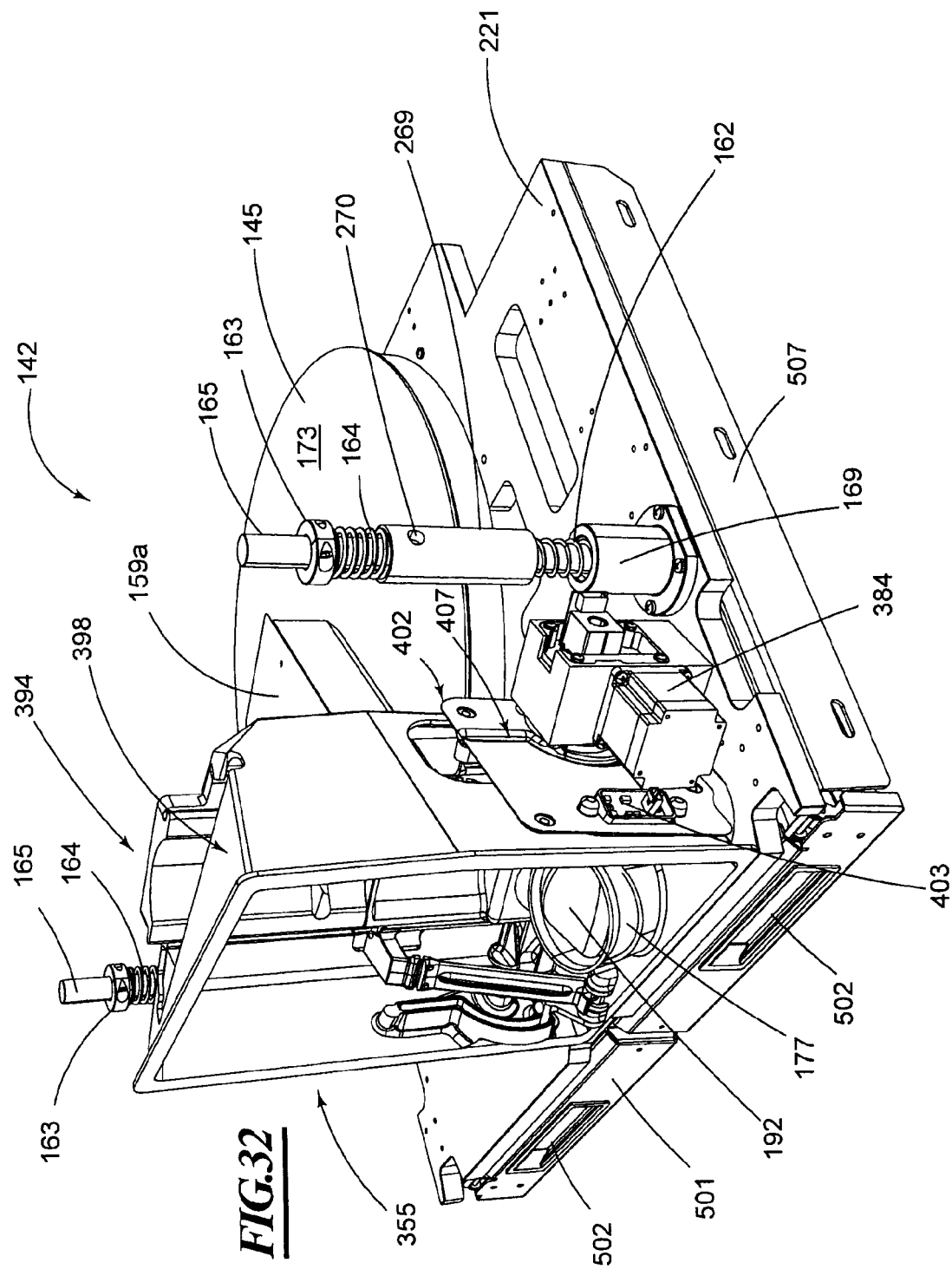
FIGS. 32-33 are partial front perspective views of the cup-lifter mechanism, freeze plate and scraper body as illustrated in FIGS. 22-23 and 25-26.
Figure 33:
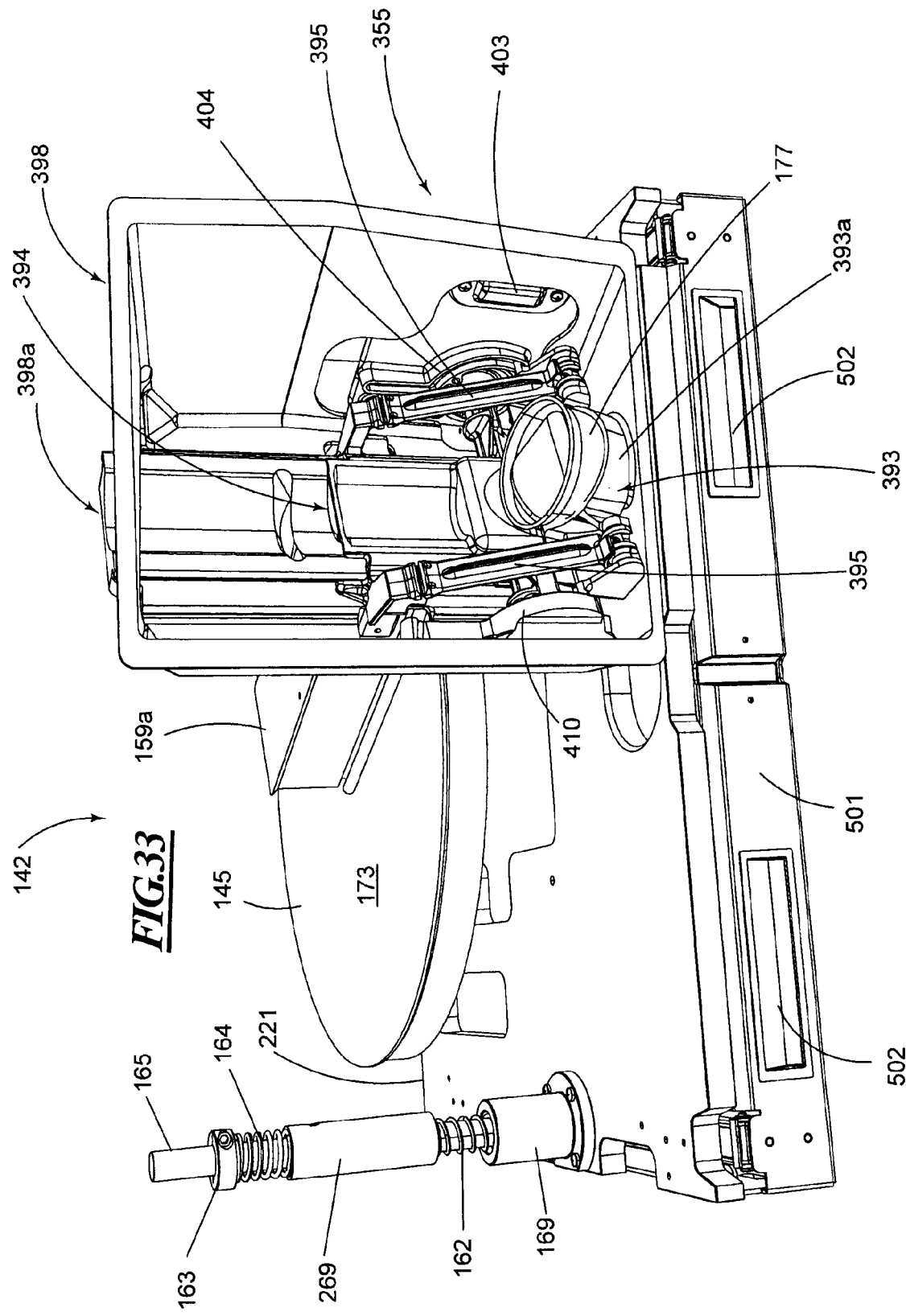

As shown in FIGS. 30-31, a sensor 241, such as an optical or magnetic sensor, may be supported above the platform 221 by a bracket 242. When the rack 186 and plow 187 have been moved to the retracted or home position shown in FIG. 30, the flag 243, which can be a magnet or other suitable device for use with the sensor 241, is disposed above the sensor 241 for purposes of generating a signal to stop the action of the plow motor 178. In the position shown in FIG. 31, the plow 187 is in a position to be cleaned by the wiper elements 217 shown in FIG. 29. Specifically, the wiper elements 217 may be built into or coupled to the door 194. After the cup 177 is filled with a scoop or portion 192, and the cup-holder 193 is ready to be pivoted downward to the position shown in FIGS. 27-28 so the cup 177 can be retrieved by the consumer, the plow 187 is may be retracted slightly from the position shown in FIGS. 29 and 31 so that when the door 194 is lowered under the action of the motor 184, the wiper elements 217 will clean the front surface 187a of the plow 187 and deposit the scrap material in the waste channel 218 of the frame 198 of the cup-lifter mechanism 155 (see FIG. 29).

Turning to FIGS. 32-45, a slightly different cup-lifter mechanism 355 is illustrated. Referring first to the exploded view of FIG. 34, the cup-lifter motor 384 includes a coupling element 345 that is coupled to the right end 399 of the shaft 401. The right end 399 of the shaft 401 passes through the opening 351 in the plate member 402 that is mounted to the frame 398. The motor 384 is coupled to the side plate 402 (or frame 398 if no side plate 402 is employed) using conventional fasteners. A home sensor is shown at 403 which may be used to detect the presence of a cup 177 placed in the cup-holder 393, the return of the cup-holder 393 to the home position shown in FIGS. 32-33 or the departure of the cup-holder 393 from the home position. A seal 404 is provided to inhibit liquid material from entering the motor coupling 345. The shaft 401 includes a tongue 405 that is received within a groove 406 of the rear end 393b of the cup-lifter mechanism 393. The tongue 405 and shaft 401 are disposed beneath the flap-shaped rear end 393b of the cup-holder 393. The front end 393a of the cup-holder 393 is pivotally coupled to proximal ends the arms 395 at the snap-fit pivotal connections shown at 396a, 396b. The cup-holder 393 also includes outwardly extending pins 406 that are received in the shaped tracks 407 disposed at either end of the cup-holder 393 as illustrated in FIGS. 35-36. Again, the left and right plates 410, 402 are optional and the tracks 407 may be integral components of the frame 398.

The left side plate 410 includes a track 407 as does the right side plate 402. The frame 398 includes an opening 476 that is coupled to a rear plate 398a that includes an opening 376 for receiving a portion or serving 192. The use of a rear plate 398a is also optional and one or more features of the rear plate 398a may also be integral features of the frame 398. The frame 398 also includes a cup rest or support 411. The rear plate 398a or frame 398 preferably includes a pair of tracks 399 on which the door 394 is slidably mounted. The distal ends of the arms 395 are coupled to the door or elevator 394 at the snap-fit pivotal connections shown at 397a, 397b. Similar to the embodiment 155 illustrated above, the cup-lifter mechanism 355 also includes a wiper element 317 supported by the door 394 for wiping the face 187a of the plow 187. The scraper body 159 may be coupled to the rear plate 398a or frame 398 using the brackets 412 and to the frame 398 using the bracket 413.

The drive coupling 345 passes through the opening 351 in the plate 402 before engaging the shaped pivot shaft 399. Rotation of the shaft 399 under the force of the motor 384 results in the pivotal and upward movement of the cup-holder 393 along the paths of the tracks 407 and upward movement of the door 394 as the cup-holder 393 and door 394 coupled by the arms 395.

Figure 34:
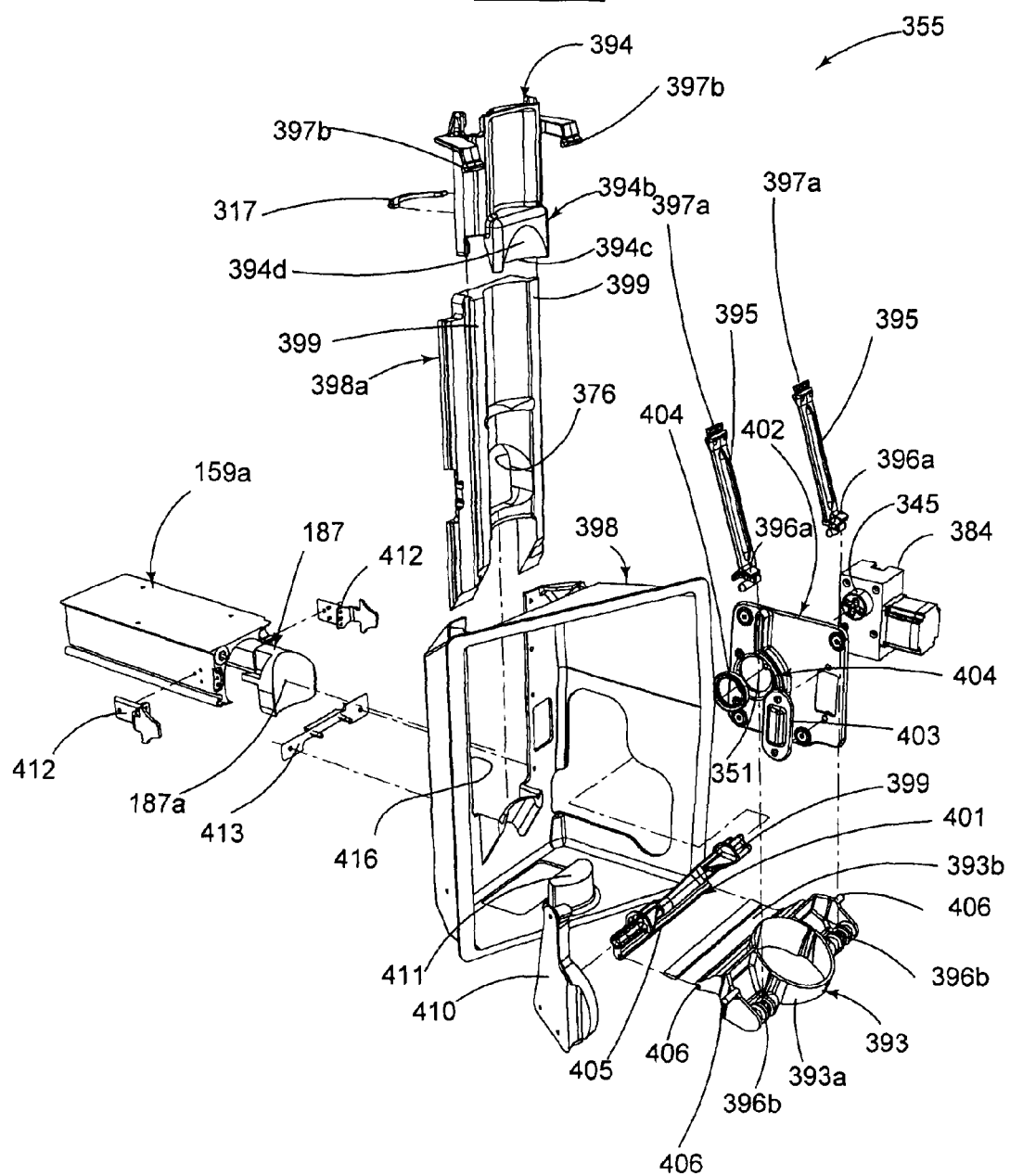
FIG. 34 is an exploded view of one disclosed cup-lifter mechanism illustrated in FIGS. 32-33 and 35-43.
Figure 35:
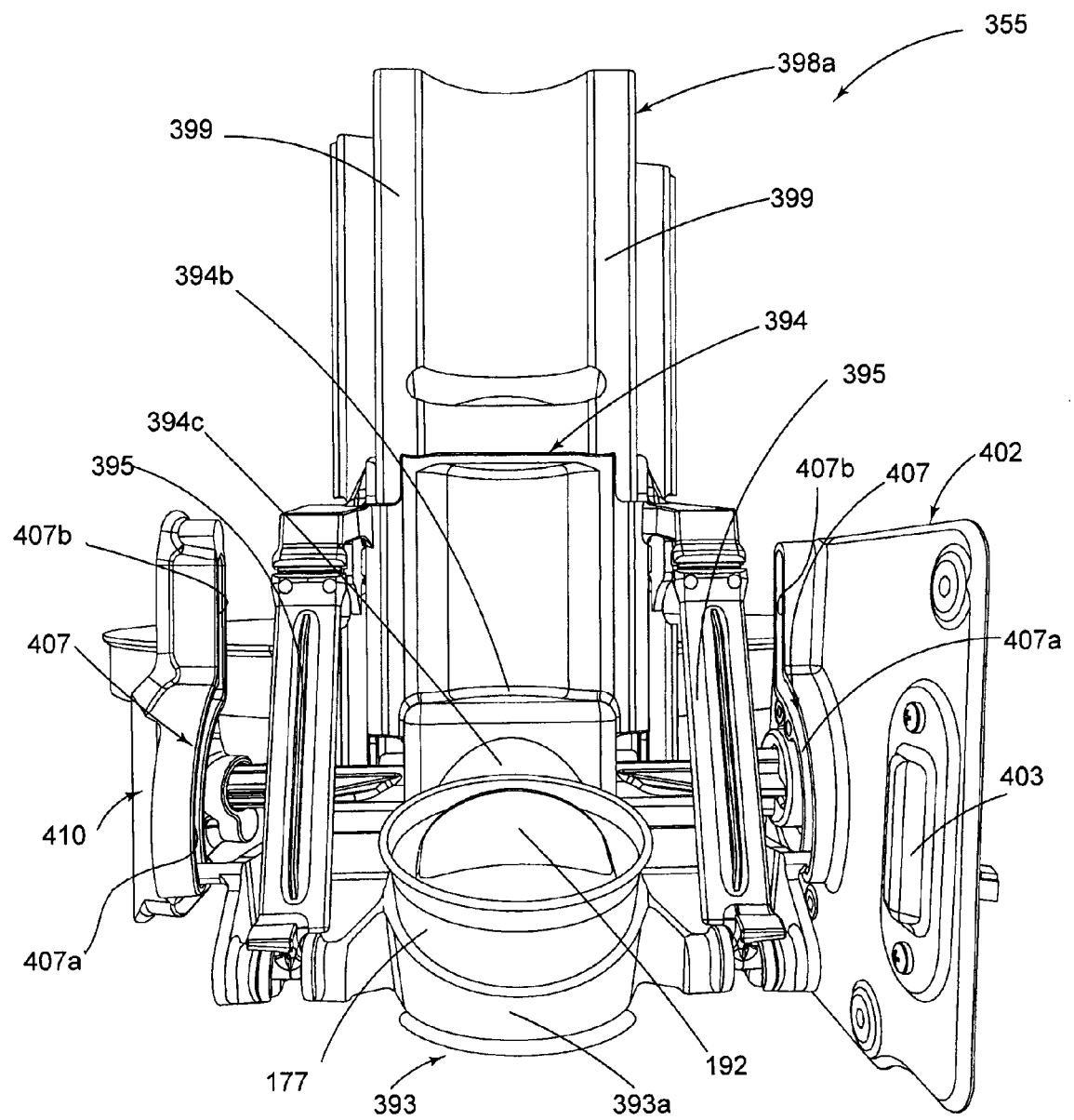
FIG. 35 is a front perspective view of the cup-lifter mechanism illustrated in FIGS. 32-33 and 36-43 with the cup-holder in the down position.
Figure 36:
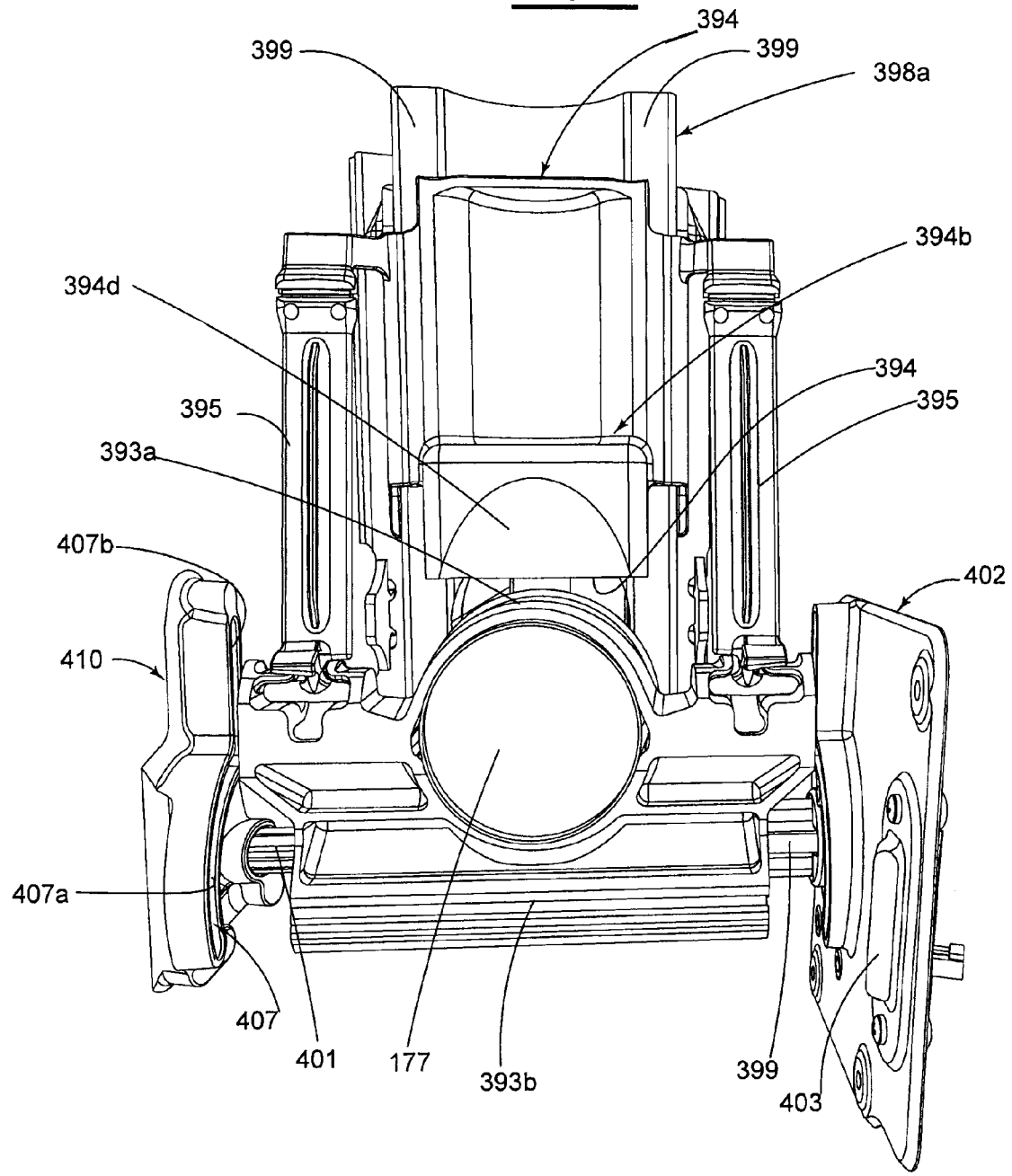
Figures 44, 45:
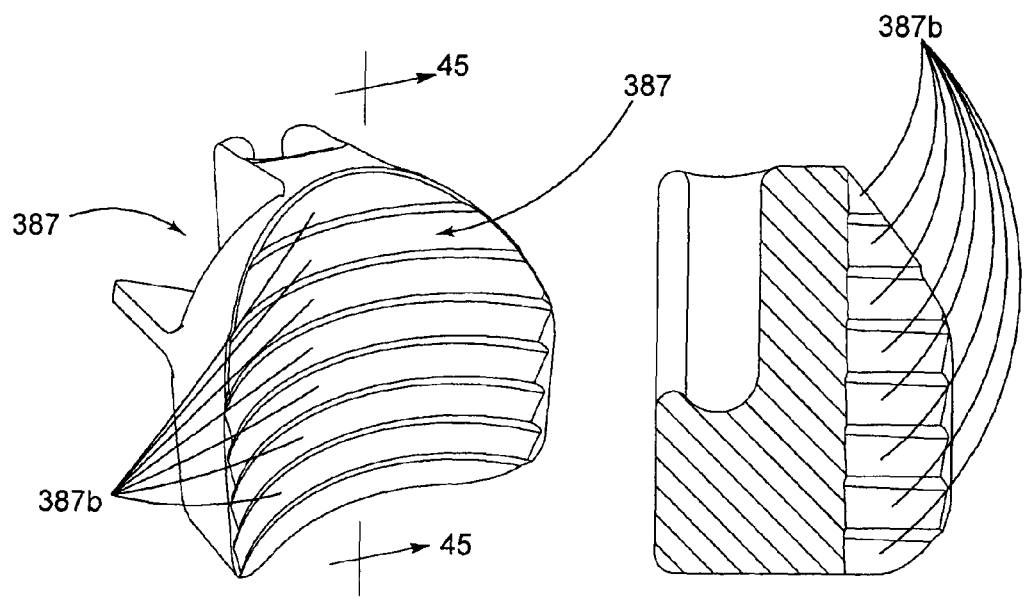
FIG. 44 is a perspective view of a plow with an improved face design that inhibits sticking of the product against the plow after the plow has pushed a product serving into a cup.
FIG. 45 is a sectional view taken substantially along line 45-45 of FIG. 44.

The cup-lifter mechanism 355 illustrated in FIGS. 32-43 address problems associated with the prepared a serving or scoop 192 sticking to the face 187a of the plow 187. Specifically, the shaped tracks 407 disposed in the right side plate 402 and left side plate 410 are illustrated in FIGS. 38-43. Each track 407 includes a curved or arcuate portion 407a and a straight or vertical portion 407b. The pins or shafts 406 disposed on either end of the cup-holder 393 are received in the tracks 407. The arcuate portions 407a of the tracks 407 cause the cup-holder 393 to pivot upward from the position shown in FIG. 35 to the position shown in FIG. 36. However, to place the cup 177 squarely in front of the opening 376 in the rear wall or plate number 398a, the motor 384 continues to rotate causing the pins 406 of the cup-holder 393 to ride upward at least partially along the vertical portions 407b of the tracks 407. After the desired amount of vertical movement, the cup 177 and cup-holder 393 arrives at the position shown in FIG. 37 where the cup 177 is ready to receive a scoop or portion 192 through the opening 376 (FIG. 34).

Further, the vertical track portions 407b may be helpful in preventing sticking of the scoop or portion 192 against the plow face 187a. Specifically, before or during the initial refraction of the plow 187, the cup-lifter motor 384 can rotate in a reverse or downward direction thereby drawing the cup-holder 393 and cup 177 in an initial vertical downward motion which results in a downward force imposed by the cup 177 against the portion or scoop 192 and releasing the portion 192 from the face 187a of the plow 187. Accordingly, the arcuate portions 407a of the tracks 407 provide the pivotal movement required to place the cup 177 and the intermediate position illustrated in FIG. 36 and the vertical portions 407b of the tracks 407 raise the cup 177 and cup-holder 393 slightly upward from the position shown in FIG. 36 to the receiving position shown in FIG. 37. Then, to dislodge a scoop or portion 192 from the plow face 187a, the initial downward vertical movement caused by the vertical track segments 407b imposes a downward force on the scoop or portion 192 by the cup 177 thereby dislodging the portion 197 from the plow face 187a. It will be noted again that separate left and right plate members 410, 402 are optional and that the tracks 407 as well as openings or bushings 351, 351 may be molded directly into the frame 398.

Figure 46:
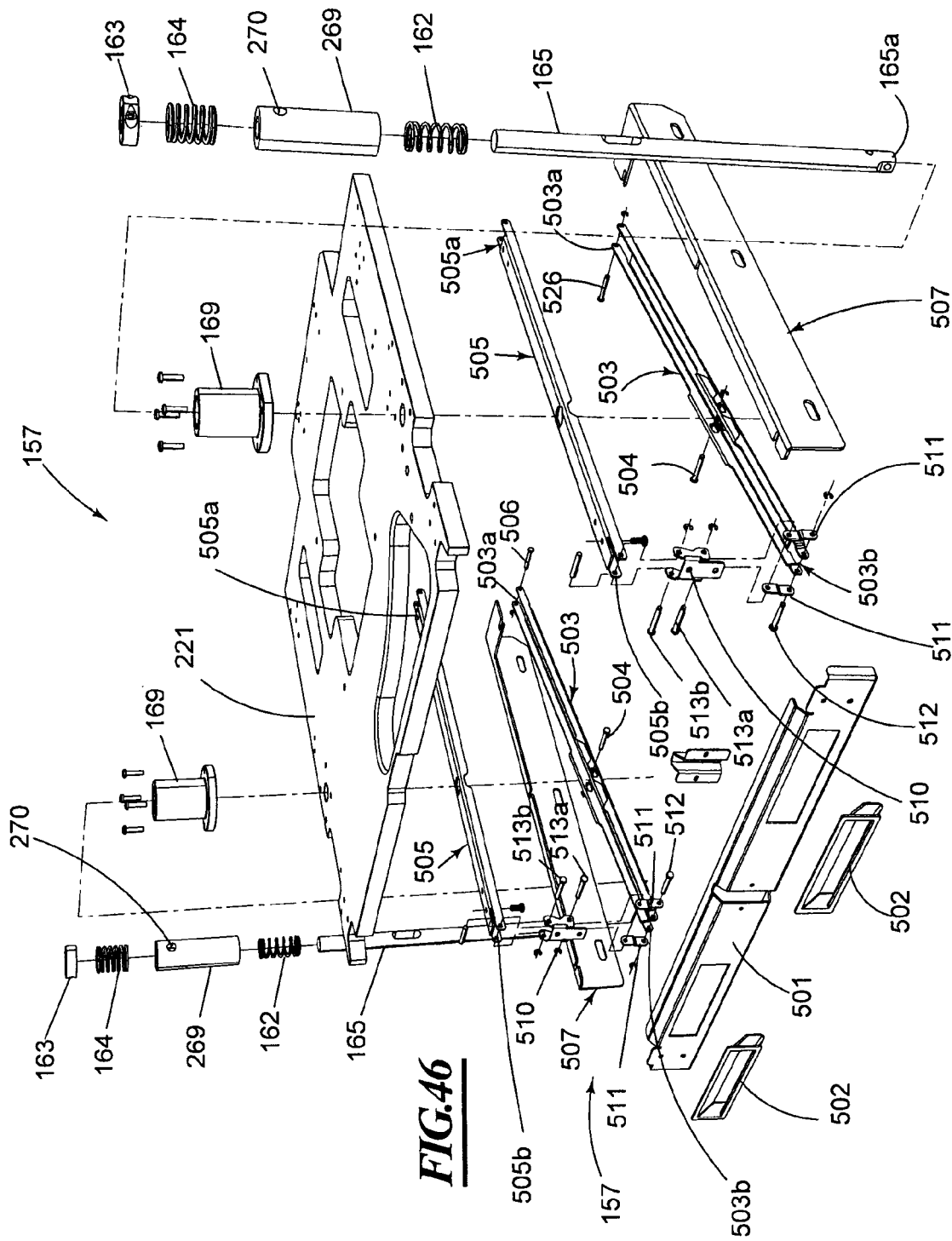
FIG. 46 is an exploded view of one disclosed hold-down mechanism used to unlock the product fabrication module from engagement with the rotating freeze plate to permit cleaning and sanitation of the product fabrication module and for providing a desired consistent downward force of scraper body against the rotating freeze plate in the locked or clamped-down position.

Finally, the clampdown mechanism 157 is illustrated in greater detail in connection with FIGS. 46-49. Turning first to FIG. 46, a front panel 501 is provided with two handles 502. The front panel 501 serves as a lever. The posts 165 are coupled to the clamps 166 that couple the posts 165 to the hold-down plate 158 at the through openings 270 in the bushings 269 (see also the alternative embodiment of FIG. 27 where the clamp 166 is coupled directly to the post 165 at the through opening 170a). The collars 163 are mounted onto the posts 165 and are used to set the tension of the upper springs 164. The lower springs 162 are trapped between the linear bushings 169 that are coupled to the platform 221 and the middle bushings 269. The lower ends 165a of the posts 165 are coupled to the lower brackets 503 below the linear bushings 169 by the pins shown at 504. The forked distal ends 503a of the brackets 503 are coupled to the forked distal ends 505a of the upper brackets 505 using the pins shown at 506. The distal ends 503a, 505a of the upper and lower brackets 503, 505 are also coupled to the stationary side brackets 507, which may be fixedly coupled to the underside of the platform 221. In the hold-down mechanism 157 illustrated in FIG. 46, the brackets 505 and 507 are stationary and the lower brackets 503 can pivot downward about an axis defined by the pins 506 and provide the hold-down or clamping force imposed on the posts 165.

Figure 47:
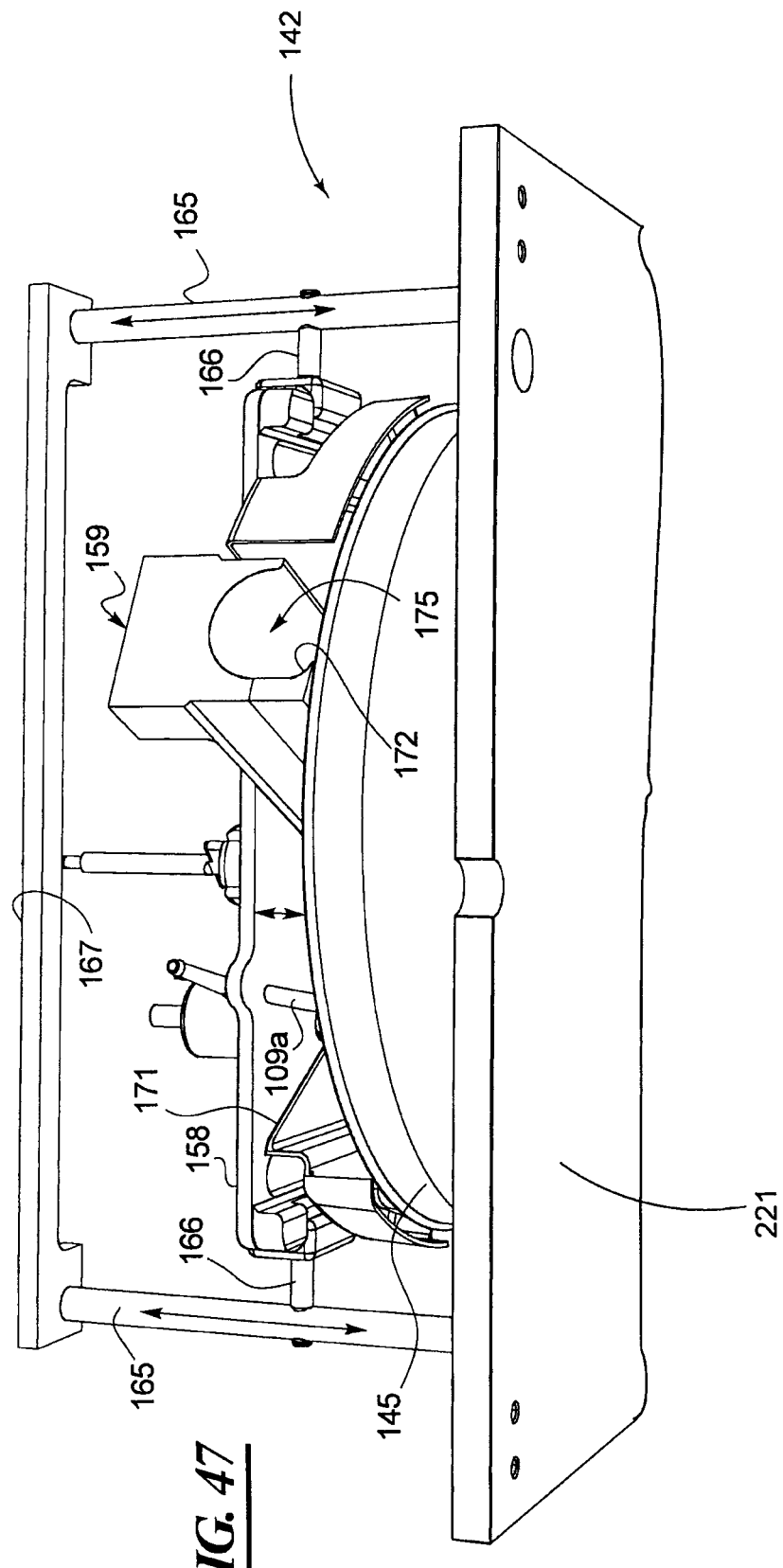
FIG. 47 is a partial bottom perspective view of the product fabrication module illustrating the connection of the hold-down plate to the posts or risers of the hold-down mechanism illustrated in FIGS. 46 and 48-49.

The front or proximal ends 503b of the lower brackets 503 are linked or coupled to middle coupling members 510 by the short links shown at 511 and the pins 512, 513a. The middle coupling members 511 are then coupled to the proximal ends 505b of the upper brackets 505 by the pins 513b. The entire mechanism 157 is mounted to the underside of the platform 221 as shown in FIG. 47. It will be noted that variations exist between the posts 165, bearings 169, bushings 269, springs 164, 162, collars 163 and clamps 166 shown in FIGS. 46 and 27. These variations are incidental and are intended to reflect the flexibility of the design of the hold-down mechanism 157.

Figure 48:
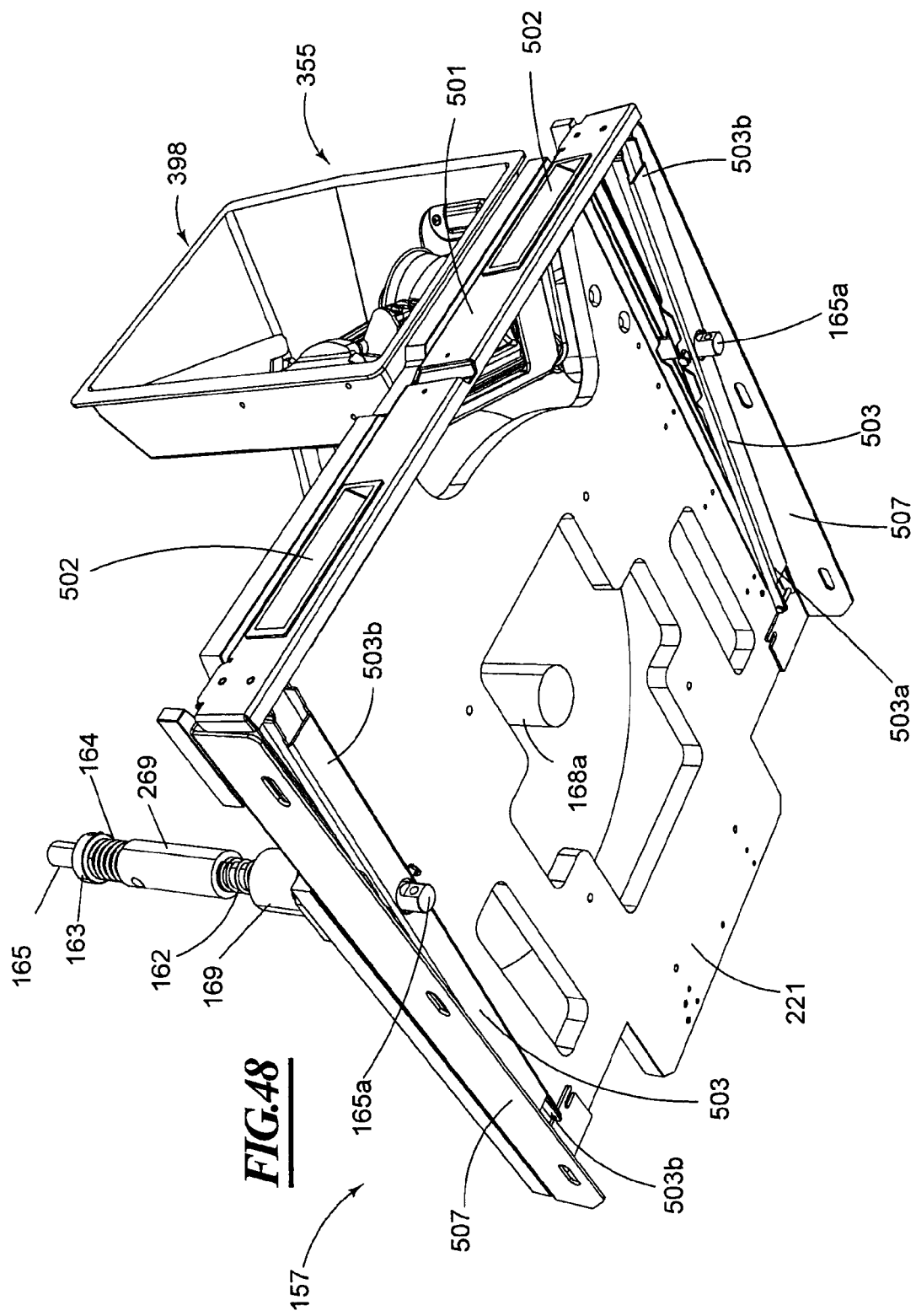
FIG. 48 is a bottom perspective view of the hold-down mechanism shown in FIG. 46 in the down, locked or clamped position.

In FIG. 48, the hold-down mechanism 157 has been moved to the locked or clamped position and the machine 130 is ready for use. Specifically, the lever 501 has been pushed downward causing the lower brackets 503 to pivot away from the fixed upper brackets 505. As the lower brackets 503 are coupled to the lower ends 165a of the vertical posts 165, the posts 165 are pulled vertically downward through the linear bearings 169 against the bias imposed by the springs 162, 164. A triple pivot action provided by the lower pins 512, the short links 511, the middle pins 513a, the middle coupling members 511 and the upper pins 513a. The three pivot axes are provided by the pins 512, 513a and 513b. Further, an upward bias is imposed on the lower brackets 503 by the springs 162, 164 by way of the connection between the lower ends 165a of the posts 165 and the lower brackets 503. When the lever 501 is pivoted downward from the position shown in FIG. 49 to the position shown in FIG. 48, the middle coupling members 510 arc downward towards a vertical orientation and the short links 511 arc upwardly towards a vertical orientation. As the middle coupling members 510 and short links 511 become vertically aligned and rotate slightly past vertical alignment, the middle pins 513a reach an "over center" position which, in combination with the upward bias is imposed by the springs 164, 162, snaps or locks the mechanism 157 in place. When the lever 505 is pulled outward and upward along the arc shown by the arrow 520 in FIG. 49, the short links 511 and middle coupling members 510 arc outward away from platform 221 before being pulled upward by the springs 162, 164 and posts 165.

In the unlocked position illustrated in FIG. 49, the clamps 166 and hold-down plate 158 move vertically upward to release the scraper body 159 from the downward force imposed by the hold-down plate 158 and hold-down mechanism 157. Then, the scraper body 159, 159a and cup lift mechanism 155, 355 may be pulled outward from the liner 154 of the fabrication module 142 (FIG. 2) for daily cleaning and sanitization. With the cup-lifter mechanism 155 and scraper body 159 removed, the operator has easy access to the plow 187, feed conduit 209a, hold-down plate 158, freeze plate 145, and spreader body 161 and other items that may need to be removed from the liner 154 and cleaned. The conduit 209a may be a disposable item and discarded.

In operation, a clean plow 187 may be installed. A clean spreader body 161 and conduit 209a are then coupled to a clean hold-down plate 158 and the hold-down plate 158 is coupled to the clamps 166 whereby a friction fit or snap-fit action may be used to securely couple the hold-down plate 158 to the clamps 166. Then, a clean cup-lifter mechanism 155 and scraper body 159 are slid into place and the hold-down mechanism 157 may be locked into place, or in the position shown in FIG. 48.

After the chiller 144 has cooled the freeze plate 145 to the desired temperature and with the fabrication module 142 and hold-down mechanism 157 in the locked position (FIG. 48), a portion 192 may be prepared. The spreader body 161 is moved to the spreading position (FIGS. 10-14). Chilled aerated mix is deposited on the rotating freeze plate 145 through the conduits 209, 209a. The electronics module 150 controls the flavor manifold 213 and selection of the base reservoir 139. The cup-lifter mechanism 155 is moved to the up position (FIG. 36). After less than one rotation of the freeze plate 145, the now frozen aerated mix (and solid mix-ins) is scraped up the by the scraper blade 172 and begins to accumulate in the channel 175. When the dispense through the conduit 209a is complete, the plow 187 is activated and proceeds down the channel 175 towards the waiting cup 177. After the plow 187 packs the portion 192 to the cup 177 (FIGS. 29 and 36), the system 130 goes into a short delay which helps cause the portion 192 to become dislodged from the face 187a of the plow 187. Then, cup-lifter mechanism 155 is moved from the position shown in FIG. 36 to the position shown in FIG. 37 to knock the portion 192 off of the plow 187 and into the cup 177. The door 394 may be lowered as the freeze plate 145 begins to rotate for the cleaning cycle and the spreader body 161 is lowered so that its bottom surface 189 engages the top surface 173 of the rotating freeze plate 145. As the door 394 is lowered, the plow 187 may be refracted a short distance to accommodate the lower edge 394c of the door 394. Subsequently, the door 394 is lowered all the way to the closed position (FIG. 35) and the face 187a of the plow 187 is cleaned by the wiper elements 317 on the door 394. Optionally, the door 394 may be cleaned by a wiper element (not shown) disposed a recess 317a in the rear plate 398a or frame 398 (FIG. 34).

Another method of operating the disclosed machine 130 to prevent the portion or scoop 192 from sticking to the plow 187 comprises: pushing a scoop 192 into the cup 177 by extending the plow 187; instituting a short delay of any retraction on movement of the plow 187, which sometimes causes dislodgement of the scoop 192 from the face of the plow 187; contemporaneously begin a short retraction of the plow 187 and lowering of the door 394; engaging any portion of the scoop 192 still adhering to the plow 187 with the lower edge 394c of the door 394; retract the plow 187 to a cleaning position where the face 187a of the plow 187 is in position to be wiped by the wiper elements 317 on the door 394; lowering the door 394 to clean the plow 187 with the wiper elements 317 on the door 394; and complete the retraction of the plow 187 through the channel 175 in preparation for the next dispense.

While only certain embodiments have been set forth, alternatives and modifications will be apparent from the above description to those skilled in the art. These and other alternatives are considered equivalents and within the spirit and scope of this disclosure and the appended claims.

The invention claimed is:

1. An apparatus for making and dispensing frozen aerated products comprising:
 a rotating horizontal freeze plate comprising an upper surface for receiving a chilled aerated mix thereon;
 a scraper for scraping frozen aerated mix off of the rotating freeze plate, the scraper forming a channel for the collection of scraped, frozen and aerated mix;
 a plow for pushing the mix through the channel towards a cup held by a cup-holder disposed at an end of the channel;
 the scraper being biased against the upper surface of the freeze plate by a hold-down plate when the hold-down plate is in a clamped position;
 wherein the hold-down plate is coupled to and extends between two vertical posts disposed on diametrically opposed sides of the freeze plate, each post being coupled to a lever, the lever moving the posts and hold-down plate from a released position where the hold-down plate and scraper can be removed for cleaning to the clamped position for fabricating scraped, frozen and aerated mix.

2. The apparatus of claim 1 wherein the posts are each coupled to a pivoting bracket, the pivoting brackets being coupled to the lever, the brackets being disposed beneath the freeze plate.

3. The apparatus of claim 2 wherein the posts are biased in an upwardly direction.

4. The apparatus of claim 2 wherein the pivoting brackets each comprise
 a proximal end and a distal end, the proximal ends of the pivoting brackets being pivotally coupled to a fixed proximal axis, the distal ends of the pivoting brackets each being coupled to fixed distal axes by two coupling members and three pins thereby forming triple pivot connections between the distal ends of the pivoting brackets and the distal fixed axes.

5. The apparatus of claim 4 wherein the pivoting brackets lock in the clamped position.

6. The apparatus of claim 2 wherein the posts are each coupled to a clamp, each clamp frictionally receiving an end of the hold-down plate.

7. The apparatus of claim 1 wherein the freeze plate, scraper and plow are disposed within a liner, the liner comprising a drain for the release of cleaning water and debris.

8. An apparatus for making and dispensing frozen aerated products comprising:
 a rotating horizontal freeze plate comprising an upper surface for receiving a chilled aerated mix thereon;
 a scraper for scraping frozen aerated mix off of the rotating freeze plate, the scraper forming a channel for the collection of scraped, frozen and aerated mix;
 a plow for pushing the mix through the channel towards a cup held by a cup-holder disposed at an end of the channel;
 the scraper being biased against the upper surface of the freeze plate by a hold-down plate when the hold-down plate is in a clamped position;
 a spreader body for distributing the chilled aerated mix on the rotating freeze plate prior to the mix engaging the scraper; and
 wherein the spreader body further comprises a cleaning edge and a spreading edge, the spreader body being pivotally coupled to a rod passing through the hold-down plate, the spreader body being movable between a spreading position where the spreading edge engages the upper surface of the freeze plate and a cleaning position where both the cleaning edge and spreading edge engage the upper surface of the freeze plate.

9. The apparatus of claim 8 wherein the spreader body is mounted beneath the hold-down plate.

10. The apparatus of claim 8 wherein the scraper is coupled to the cup holder and, when the hold-down plate is in the released position, the cup holder and scraper can be removed for cleaning and the hold-down plate and spreader body can be removed for cleaning.

11. The apparatus of claim 8 wherein the spreading edge comprises a spreader blade disposed between two rounded end supports, the spreader blade being recessed with respect to the rounded end supports wherein, in the spreading position, the spreader blade is supported above the upper surface of the freeze plate by the rounded end supports.

12. The apparatus of claim 8 wherein the spreading edge comprises a spreader blade that comprises three spaced-apart rounded supports, the spreader blade being recessed with respect to the rounded supports wherein, in the spreading position, the spreader blade is supported above the upper surface of the freeze plate by the rounded supports.

13. The apparatus of claim 8 wherein, when the spreader body moves from the cleaning position to the spreading position, the rod moves vertically upward causing the cleaning edge to pivot upward away from the freeze plate as at least one biasing member holds the spreading edge against the upper surface of the freeze plate in both the spreading and cleaning positions.

14. An apparatus for making and dispensing frozen aerated products comprising:
 a rotating horizontal freeze plate comprising an upper surface for receiving a chilled aerated mix thereon;
 a spreader body for distributing the chilled aerated mix on the rotating freeze plate prior to the mix engaging the scraper;
 a scraper for scraping frozen aerated mix off of the rotating freeze plate, the scraper forming a channel for the collection of scraped, frozen and aerated mix;
 a plow for pushing the mix through the channel towards a cup held by a cup-holder disposed at an end of the channel;
 the scraper being biased against the upper surface of the freeze plate by a hold-down plate when the hold-down plate is in a clamped position, the spreader body being coupled to the hold-down plate, the scraper being coupled to the cup-holder;
 the hold-down plate being coupled to and extending between two vertical posts disposed on diametrically opposed sides of the freeze plate, each post being coupled to a lever, the lever moving the posts and hold-down plate from a released position where the hold-down plate and scraper can be removed for cleaning to the clamped position for fabricating scraped, frozen and aerated mix.

15. The apparatus of claim 14 wherein the posts are each coupled to a pivoting bracket, the pivoting brackets being coupled to the lever, the brackets being disposed beneath the freeze plate.

16. The apparatus of claim 14 wherein the posts are biased in an upwardly direction and the posts are each coupled to a clamp, each clamp frictionally receiving an end of the hold-down plate.

17. The apparatus of claim 16 wherein the pivoting brackets each comprise a proximal end and a distal end, the proximal ends of the pivoting brackets being pivotally coupled to a fixed proximal axis, the distal ends of the pivoting brackets each being coupled to fixed distal axes by two coupling members and three pins thereby forming triple pivot connections between the distal ends of the pivoting brackets and the distal fixed axes, wherein the pivoting brackets lock in the clamped position.

\* \* \* \* \*